United States Patent
Zhao et al.

(10) Patent No.: US 11,923,909 B1
(45) Date of Patent: Mar. 5, 2024

(54) SELF-COHERENT RECEIVER BASED ON POLARIZATION-INDEPENDENT DELAY INTERFEROMETERS

(71) Applicant: BEIJING ZHONGKE GUOGUANG QUANTUM TECHNOLOGY CO., LTD., Beijing (CN)

(72) Inventors: Yibo Zhao, Beijing (CN); Dong Wang, Beijing (CN); Dongsheng Chen, Beijing (CN)

(73) Assignee: BEIJING ZHONGKE GUOGUANG QUANTUM TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/211,651

(22) Filed: Jun. 20, 2023

(30) Foreign Application Priority Data

Aug. 29, 2022 (CN) .......................... 202211036893.6

(51) Int. Cl.
*H04B 10/61* (2013.01)
*G02F 1/21* (2006.01)

(52) U.S. Cl.
CPC ........... *H04B 10/614* (2013.01); *G02F 1/212* (2021.01); *H04B 10/616* (2013.01)

(58) Field of Classification Search
CPC ...... H04B 10/616; H04B 10/614; G02F 1/212
USPC ...................................................... 398/202
See application file for complete search history.

(56) References Cited

U.S. PATENT DOCUMENTS

| | | | | |
|---|---|---|---|---|
| 7,733,497 B2* | 6/2010 | Yun | .................... | G01B 9/02075 356/497 |
| 11,271,647 B2* | 3/2022 | Wang | .................... | H04B 10/503 |
| 11,757,534 B1* | 9/2023 | Zhao | .................... | H04B 10/677 398/202 |
| 2009/0196610 A1* | 8/2009 | Isomura | .................. | H04J 14/06 398/65 |
| 2010/0215374 A1* | 8/2010 | Liu | ........................ | H04J 14/06 398/98 |

FOREIGN PATENT DOCUMENTS

EP 2495893 B1 * 12/2016 ............. H04B 10/60

OTHER PUBLICATIONS

Li et al; A self-coherent receiver for detection of PolMUX coherent signals; 2012; Optical Society of America; pp. 1-21. (Year: 2012).*
Li et al ; A self-coherent receiver for detection of Pol MUX coherent signals; Sep. 2012; pp. 1-12. (Year: 2012).*

* cited by examiner

*Primary Examiner* — Amritbir K Sandhu
(74) *Attorney, Agent, or Firm* — COOPER LEGAL GROUP, LLC

(57) ABSTRACT

Disclosed is a self-coherent receiver based on polarization-independent delay interferometers, relating to a technical field of optical communication, including a first beam splitter, a first circulator, a second circulator, a first polarization-independent delay interferometer, a second polarization-independent delay interferometer, a first balanced detector, a second balanced detector and an electrical signal processing module.

18 Claims, 5 Drawing Sheets

SELF-COHERENT RECEIVER BASED ON POLARIZATION-INDEPENDENT DELAY INTERFEROMETERS

CROSS-REFERENCE TO RELATED APPLICATION

This application claims the priority and benefit of Chinese patent application serial no. 202211036893.6, filed on Aug. 29, 2022. The entirety of Chinese patent application serial no. 202211036893.6 is hereby incorporated by reference herein and made a part of this specification.

TECHNICAL FIELD

This application relates to a technical field of optical communication, and, in particular, to a self-coherent receiver based on polarization-independent delay interferometers.

BACKGROUND

A conventional optical communication system generally adopts a coherent reception way, that is, a local oscillator light source is used at the receiving terminal to mix with the received signal light and undergoes a subsequent processing. This method requires an additional laser, while the signal will be affected by frequency deviation and laser phase noise, and excessive digital signal processing will increase the additional system cost. It is unnecessary by a self-coherent detection technology to use a local oscillator laser at the receiving terminal, but a delay interferometer can be used, such that the signal light undergoes a delayed self-interference, which reduces the complexity of the receiving terminal.

However, the polarization of the signal light will become random after being transmitted to the receiving terminal through the fiber channel, which will affect the stability of the delayed self-interference result. The first one of the commonly solutions is to use a polarization controller to calibrate the polarization state of the received signal light in real time, which requires a relative complex system and depends heavily on the polarization scrambling speed; the second one thereof is to use polarization diversity technology, in the related technology, the signal light is divided into two components whose polarization states are perpendicular to each other and perform a delayed self-interference, such that service data loaded by signals is restored through comparison or summation of the electrical signals. However, the polarization diversity technology requires two pairs of delay interferometers and an additional electronic processing module, which increases the complexity of the system. There is also a sampling mixing and integration technology, in the related technology, the polarization-independent self-interference of signal light is achieved by inserting a half-wave plate into an interferometer composed of a polymer waveguide, but this solution is difficult to manufacture and requires precise control of the length of four thermal phase modulators, which increases the complexity of the receiving terminal.

SUMMARY

In view of the above defects in the prior art, a self-coherent receiver based on polarization-independent delay interferometers is disclosed.

Technical scheme of the present disclosure is realized as follows:

A self-coherent receiver based on polarization-independent delay interferometers, including a first beam splitter, a first circulator, a second circulator, a first polarization-independent delay interferometer, a second polarization-independent delay interferometer, a first balanced detector, a second balanced detector and an electrical signal processing module.

The first beam splitter is configured to split a received signal light, to generate a first signal light component and a second signal light component.

The first circulator is configured to transmit the first signal light to a first port of the first polarization-independent delay interferometer; the second circulator is configured to transmit the second signal light to a first port of the second polarization-independent delay interferometer.

The first polarization-independent delay interferometer has a long arm and a short arm, to perform a polarization-independent delayed self-interference on the first signal light component, so as to generate a first interference optical signal and a second interference optical signal respectively output from the first port and a second port of the first polarization-independent delay interferometer; the second polarization-independent delay interferometer has a long arm and a short arm, a phase difference between the long arm and the short arm is $\pi/2$, to perform a polarization-independent delayed self-interference on the second signal light component, so as to generate a third interference optical signal and a fourth interference optical signal respectively output from the first port and a second port of the second polarization-independent delay interferometer.

The first circulator is further configured to transmit the first interference optical signal output from the first port of the first polarization-independent delay interferometer to the first balanced detector; the second circulator is further configured to transmit the third interference optical signal output from the first port of the second polarization-independent delay interferometer to the second balanced detector.

The first balanced detector is configured to perform a balanced detection on the first interference optical signal and the second interference optical signal, to generate a first differential current signal; the second balanced detector is configured to perform a balanced detection on the third interference optical signal and the fourth interference optical signal, to generate a second differential current signal.

The electrical signal processing module is configured to receive the first differential current signal and the second differential current signal, further process them after sampling, to restore service data.

Compared with the prior art, the following beneficial effects are realized:

A self-coherent receiver based on polarization-independent delay interferometers is disclosed, which can realize delayed self-coherence independent of the signal light polarization without using a polarization controller to actively calibrate the signal light polarization, thereby eliminating influence of the random change of the polarization state of the signal light on the receiver, which improves the stability of the receiver. Moreover, the receiver only requires two delay interferometers and two sets of balanced detectors, which eliminates the influence of inconsistent performance of multiple mixers on the mixing results, reduces the difficulty and complexity of electronic signal processing after balanced detection, thus greatly reducing the complexity of the receiving terminal. At the same time, the present disclosure can be applied not only to optical communication systems, but also to continuous variable quantum key distribution systems and sensor systems, thereby having high versatility and practicability.

DESCRIPTION OF THE EMBODIMENTS

The present disclosure will be clearly and completely described below in combination with the drawings of the embodiments of the present disclosure.

Figure 1:
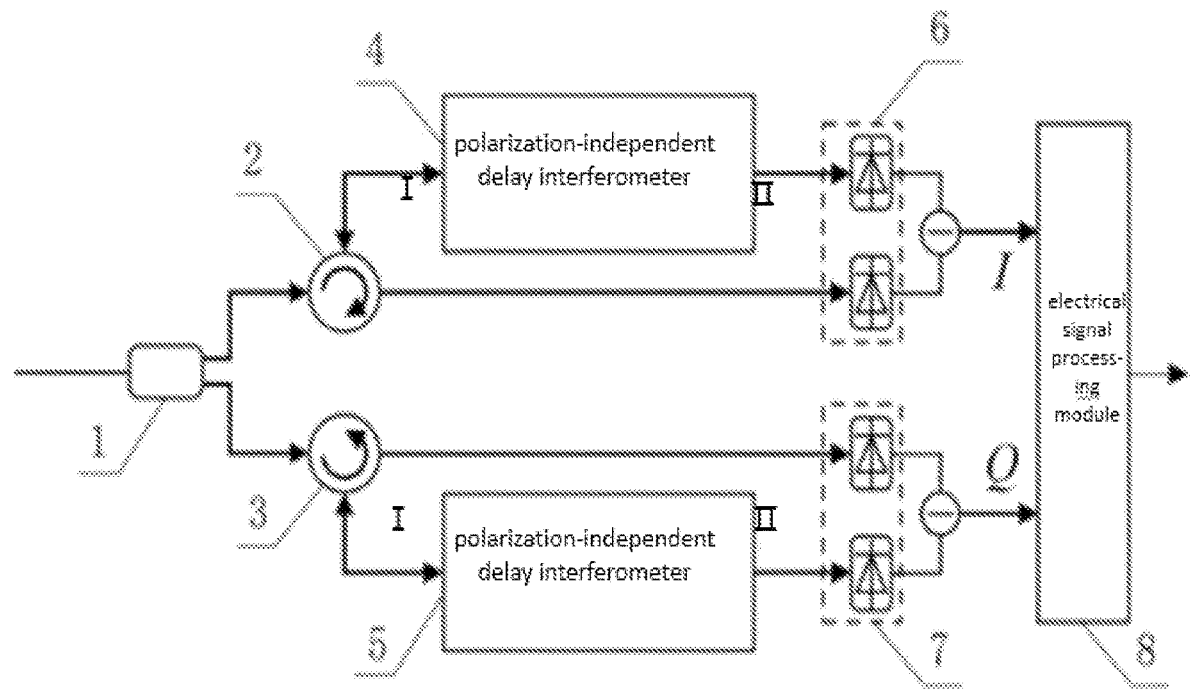
FIG. 1 is a structure schematic diagram of the self-coherent receiver based on polarization-independent delay interferometers of the present disclosure.

As shown in FIG. 1, a self-coherent receiver based on polarization-independent delay interferometers includes a first beam splitter 1, a first circulator 2, a second circulator 3, a first polarization-independent delay interferometer 4, a second polarization-independent delay interferometer 5, a first balanced detector 6, a second balanced detector 7 and an electrical signal processing module 8, wherein the first beam splitter 1, the first circulator 2, the second circulator 3, the first polarization-independent delay interferometer 4, the second polarization-independent delay interferometer 5 constitute the optical part, while the first balanced detector 6, the second balanced detector 7 and the electrical signal processing module 8 constitute the signal post-processing part.

The first beam splitter 1 is configured to split a received signal light, to generate a first signal light component and a second signal light component.

The first circulator 2 is configured to transmit the first signal light to a first port of the first polarization-independent delay interferometer 4; the second circulator 3 is configured to transmit the second signal light to a first port of the second polarization-independent delay interferometer 5.

The first polarization-independent delay interferometer 4 has a long arm and a short arm, to perform a polarization-independent delayed self-interference on the first signal light component, so as to generate a first interference optical signal and a second interference optical signal respectively output from the first port and a second port of the first polarization-independent delay interferometer; the second polarization-independent delay interferometer 5 has a long arm and a short arm, a phase difference between the long arm and the short arm is $\pi/2$, to perform a polarization-independent delayed self-interference on the second signal light component, so as to generate a third interference optical signal and a fourth interference optical signal respectively output from the first port and a second port of the second polarization-independent delay interferometer.

The first circulator 2 is further configured to transmit the first interference optical signal output from the first port of the first polarization-independent delay interferometer 4 to the first balanced detector 6; the second circulator 3 is further configured to transmit the third interference optical signal output from the first port of the second polarization-independent delay interferometer 5 to the second balanced detector 7.

The first balanced detector 6 is configured to perform a balanced detection on the first interference optical signal and the second interference optical signal, to generate a first differential current signal; the second balanced detector 7 is configured to perform a balanced detection on the third interference optical signal and the fourth interference optical signal, to generate a second differential current signal.

The electrical signal processing module 8 is configured to receive the first differential current signal and the second differential current signal, further process them after sampling, to restore service data.

The specific working principle is as follows:

The signal light received by the receiver E(t) first enters the first beam splitter 1 and is split into the first signal light component $E_1(t)$ and the second signal light component $E_2(t)$, confirming to $E_1(t)=E_2(t)=1/\sqrt{2}E(t)$. Wherein the first signal light component reaches the first port of the first polarization-independent delay interferometer 4 after passing through the first circulator 2 and goes through a polarization-independent delayed self-interference, afterwards the first interference optical signal $E_{out1}(t)$ and the second interference optical signal $E_{out2}(t)$ are generated, which can be respectively written as:

$$E_{out1}(t) = \frac{1}{2\sqrt{2}}[E(t) + E(t-\tau)]$$

$$E_{out2}(t) = \frac{1}{2\sqrt{2}}[E(t) - E(t-\tau)]$$

wherein $\tau$ is the delay corresponding to the arm length difference between the long arm and the short arm of the first polarization-independent delay interferometer 4.

The first interference optical signal and the second interference optical signal are respectively output from the first port and the second port of the first polarization-independent delay interferometer 4. The second interference optical signal directly enters one photoelectric detector of the first balanced detector 6, and the first interference optical signal enters another photoelectric detector of the first balanced detector 6 after passing through the first circulator 2, a first differential current signal is generated after undergoing a balanced detection, namely an in-phase component, which can be written as:

$$I_I(t) = \frac{R}{2}|E(t)||E(t-\tau)|\cos(\omega\tau)$$

wherein R is the response efficiency of the photoelectrical detector, and ω is the angular frequency of the signal light.

The second signal light component reaches the first port of the second polarization-independent delay interferometer 5 through the second circulator 3 and goes through a polarization-independent delayed self-interference. After that, because the phase difference between the long arm and the short arm of the second polarization-independent delay interferometer 5 is π/2, the third interference optical signal $E_{out3}(t)$ and the fourth interference optical signal $E_{out4}(t)$ are generated, which can be respectively written as:

$$E_{out3}(t) = \frac{1}{2\sqrt{2}}[E(t) + jE(t-\tau)]$$

$$E_{out4}(t) = \frac{1}{2\sqrt{2}}[E(t) - jE(t-\tau)]$$

wherein, τ is the delay corresponding to the arm length difference between the long arm and the short arm of the second polarization-independent delay interferometer 5.

The third interference optical signal and the fourth interference optical signal are respectively output from the first port and the second port of the second polarization-independent delay interferometer 5. The fourth interference optical signal directly enters one photoelectric detector of the second balanced detector 7, and the third interference optical signal enters another photoelectric detector of the second balanced detector 7 after passing through the second circulator 3, a second differential current signal is generated after undergoing a balanced detection, namely a quadrature component, which can be written as:

$$I_Q(t) = \frac{R}{2}|E(t)||E(t-\tau)|\sin(\omega\tau)$$

Finally, the electrical signal processing module 8 synthesizes the electrical signal in in-phase component and the electrical signal in quadrature component into a complex signal, which can be written as:

$$u(t) = I_I(t) + jI_Q(t) = \frac{R}{2}E(t)E^*(t-\tau)$$

The above complex signal is sampled and digitally processed by the electrical signal processing module 8, to restore the electric field information of the signal light, so as to obtain service data.

Figure 2A:
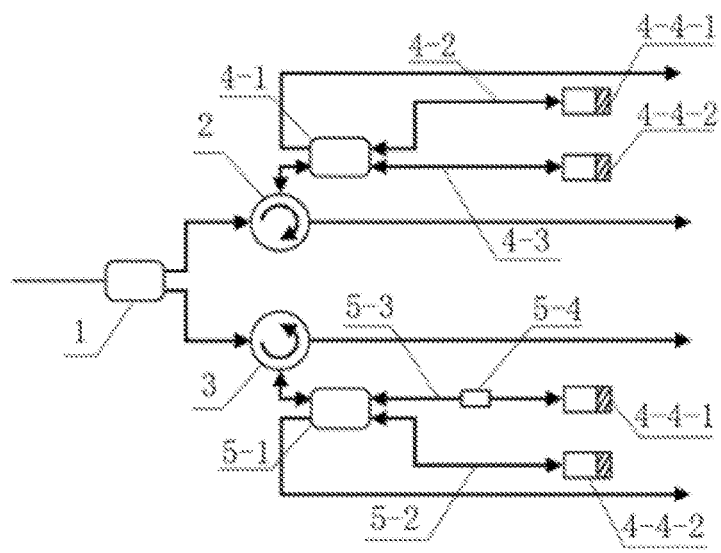
FIG. 2A is a schematic diagram of the self-coherent receiver based on polarization-independent delay interferometers of Embodiment 1 of the present disclosure (optical part)

FIG. 2A shows the self-coherent receiver based on polarization-independent delay interferometers of Embodiment 1 of the present disclosure:

The self-coherent receiver based on polarization-independent delay interferometers is so configured, that the first polarization-independent delay interferometer 4 includes a second beam splitter 4-1, a first long-arm optical fiber 4-2, a first short-arm optical fiber 4-3 and a first reflection module.

The second beam splitter 4-1 is configured to split the input first signal light component, to generate a first long-arm component and a first short-arm component, which respectively enter the first long-arm optical fiber 4-2 and first short-arm optical fiber 4-3.

The first reflection module is configured to respectively reflect the first long-arm component transmitted through the first long-arm optical fiber 4-2 and the first short-arm component transmitted through the first short-arm optical fiber 4-3, such that the horizontal polarization component and the vertical polarization component of the both are respectively rotated to be vertically polarized and horizontally polarized.

The second beam splitter 4-1 is further configured to interfere the reflected first long-arm component and first short-arm component, to generate a first interference optical signal and a second interference optical signal.

The second polarization-independent delay interferometer 5 includes a third beam splitter 5-1, a second long-arm optical fiber 5-2, a second short-arm optical fiber 5-3, a first phase shifter 5-4 and a second reflection module.

The third beam splitter 5-1 is configured to split the input second signal light component, to generate a second long-arm component and a second short-arm component, which respectively enter the second long-arm optical fiber 5-2 and the second short-arm optical fiber 5-3.

The second reflection module is configured to respectively reflect the second long-arm component transmitted through the second long-arm optical fiber 5-2 and the second short-arm component transmitted through the second short-arm optical fiber 5-3, such that the horizontal polarization components and the vertical polarization components of the both are respectively rotated to be vertically polarized and horizontally polarized.

The first phase shifter 5-4 is configured to adjust phase of the second short-arm component, so that a phase difference between it and the second long-arm component is π/2.

The third beam splitter 5-1 is further configured to interfere the reflected second long-arm component and second short-arm component, to generate a third interference optical signal and a fourth interference optical signal.

The first reflection module and the second reflection module each include a first Faraday mirror 4-4-1 and a second Faraday mirror 4-4-2, the first Faraday mirror 4-4-1 and the second Faraday mirror 4-4-2 are respectively configured to reflect the input optical signal, such that its polarization state is rotated by 90°.

Figure 2B:
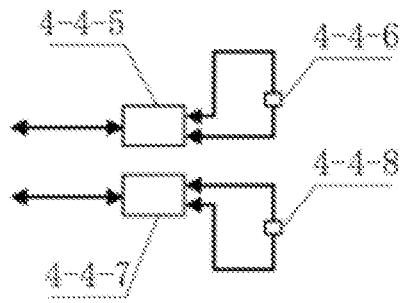
FIG. 2B is a schematic diagram of the first reflection module or the second reflection module of the self-coherent receiver based on polarization-independent delay interferometers of Embodiment 1 of the present disclosure.

FIG. 2B shows the first reflection module and the second reflection module of Embodiment 1. The first reflection module and the second reflection module are either a Sagnac ring composed of a fifteenth polarization beam splitter 4-4-5, a first 90° Faraday rotator 4-4-6 or a second Sagnac ring composed of a sixteenth polarization beam splitter 4-4-7 and a second 90° Faraday rotator 4-4-8.

Two output ports of the fifteenth polarization beam splitter 4-4-5 are respectively connected to the first 90° Faraday rotator 4-4-6 through a polarization-maintaining fiber; two output ports of the sixteenth polarization beam splitter 4-4-7 are respectively connected to the second 90° Faraday rotator 4-4-8 through a polarization-maintaining fiber.

The first Sagnac ring and the second Sagnac ring are respectively configured to reflect the input optical signal, such that its polarization state is rotated by 90°.

The specific work process of Embodiment 1 includes:

The signal light received by the receiver E(t) first enters the first beam splitter 1 and is split into the first signal light component $E_1(t)$ and the second signal light component $E_2(t)$, conforming to $$E_1(t) = E_2(t) = 1/\sqrt{2}\, E(t).$$

When the signal light reaches the receiver through the fiber channel, the polarization becomes random, which can be expressed as:

$$E(t) = A(t)e^{j(\omega t+\varphi_0)}\begin{bmatrix} \cos\theta \\ \sin\theta e^{j\delta} \end{bmatrix},$$

wherein θ is the angle between the horizontal polarization component and the vertical polarization component of the signal light, and δ is the phase difference between the both.

The first signal light component reaches the second beam splitter 4-1 through the first circulator 2, whose polarization state becomes:

$$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix},$$

and then is split by the second beam splitter 4-1 into a first split component $E_{11}(t)$ of the first signal light and a second split component $E_{12}(t)$ of the first signal light, which respectively enter the first long-arm component 4-2 and the first short-arm component 4-3, and then reach the first Faraday mirror 4-4-1 and the second Faraday mirror 4-4-2, the polarization thereof is rotated by 90° after being reflected, and then intervene at the second beam splitter 4-1 after respectively passing through the first long-arm component 4-2 and the first short-arm component 4-3.

Since the Faraday mirror can automatically compensate the polarization change caused by fiber, the polarization state of output light is rotated by 90° relative to the polarization state of input light, so the polarization states of $E_{11}(t)$ and $E_{12}(t)$ when reaching the second beam splitter 4-1 can be respectively written as:

$$E_{11}(t) = \frac{A(t)e^{j(\omega t+\varphi_0)}}{2}\begin{bmatrix} -\sin\theta_1 e^{-j\delta_1} \\ \cos\theta_1 \end{bmatrix},$$

$$E_{12}(t-\tau) = \frac{A(t-\tau)e^{j(\omega(t-\tau)+\varphi_0)}}{2}\begin{bmatrix} -\sin\theta_1 e^{-j\delta_1} \\ \cos\theta_1 \end{bmatrix},$$

Optionally, the first Faraday mirror 4-4-1 and the second Faraday mirror 4-4-2 can be respectively replaced by the first Sagnac ring composed of the fifteenth polarization beam splitter 4-4-5 and the first 90° Faraday rotator 4-4-6, and the second Sagnac ring composed of the sixteenth polarization beam splitter 4-4-7 and the second 90° Faraday rotator 4-4-8, as shown in FIG. 2B.

Taking the first Sagnac ring as an example, an optical signal of arbitrary polarization enters the input port of the fifteenth polarization beam splitter 4-4-5, a horizontal polarization component is transmitted to its one output port, propagates counterclockwise along the first Sagnac ring, its polarization is rotated by 90° when passing through the first 90° Faraday rotator 4-4-6, afterwards it reaches the other output port of the fifteenth polarization beam splitter 4-4-5 and is output from the input port thereof and becomes to be vertically polarized.

A vertical polarization component of the optical signal is reflected to the other output port of the fifteenth polarization beam splitter 4-4-5, propagates clockwise along the first Sagnac ring, its polarization is rotated by 90° when passing through the first 90° Faraday rotator 4-4-6, afterwards it reaches the one output port of the fifteenth polarization beam splitter 4-4-5 and is output from the input port thereof and becomes to be horizontally polarized.

Therefore, the overall effect of the first Sagnac ring is to rotate the polarization of the input signal light of arbitrary polarization by 90° and reflect and output it, which is equivalent to the Faraday mirror.

$E_{11}(t)$ and $E_{12}(t)$ have the same polarization, they preform interference at the second beam splitter 4-1, such that the first interference optical signal $E_{out1}(t)$ and the second interference optical signal $E_{out2}(t)$ are generated, which can written as:

$$E_{out1}(t) = \frac{e^{j(\omega t+\varphi_0)}}{2\sqrt{2}}\left[A(t) + A(t-\tau)e^{-j\omega\tau}\right]\begin{bmatrix} -\sin\theta_1 e^{-j\delta_1} \\ \cos\theta_1 \end{bmatrix}$$

$$E_{out2}(t) = \frac{e^{j(\omega t+\varphi_0)}}{2\sqrt{2}}\left[A(t) - A(t-\tau)e^{-j\omega\tau}\right]\begin{bmatrix} -\sin\theta_1 e^{-j\delta_1} \\ \cos\theta_1 \end{bmatrix}$$

wherein τ is the delay corresponding to the arm length difference between the long arm and the short arm of the first polarization-independent delay interferometer 4.

The second interference optical signal directly enters one photoelectric detector of the first balanced detector 6, and the first interference optical signal enters the other photoelectric detector of the first balanced detector 6 after passing through the first circulator 2. The first differential current signal is generated after balanced detection, namely the in-phase component, which can be written as:

$$I_I(t) = R\left[|E_{out1}(t)|^2 - |E_{out2}(t)|^2 = \frac{R}{2}|E(t)||E(t-\tau)|\cos(\omega\tau)\right.$$

$$= \frac{R}{2}A(t)A(t-\tau)\cos(\omega\tau)$$

Among them, R is the response efficiency of the photoelectric detector, and ω is the angular frequency of the signal light. It can be seen that the in-phase component based on self-interference of the signal output from the first balanced detector 6 is polarization-independent.

The second signal light component reaches the third beam splitter 5-1 after passing through the second circulator 3, the third interference optical signal $E_{out3}(t)$ and the fourth interference optical signal $E_{out4}(t)$ are generated after undergoing a similar polarization-independent delay interference as the first signal light component. Because the first phase shifter 5-4 ensures the phase difference between the long arm and the short arm is π/2, the both can be respectively written as:

$$E_{out3}(t) = \frac{e^{j(\omega t+\varphi_0)}}{2\sqrt{2}}[A(t) + jA(t-\tau)e^{-j\omega\tau}]\begin{bmatrix} -\sin\theta_2 e^{-j\delta_2} \\ \cos\theta_2 \end{bmatrix}$$

$$E_{out4}(t) = \frac{e^{j(\omega t+\varphi_0)}}{2\sqrt{2}}[A(t) - jA(t-\tau)e^{-j\omega\tau}]\begin{bmatrix} -\sin\theta_2 e^{-j\delta_2} \\ \cos\theta_2 \end{bmatrix}$$

wherein, $\tau$ is the delay corresponding to the arm length difference between the long arm and the short arm of the second polarization-independent delay interferometer 5.

The fourth interference optical signal directly enters one photoelectric detector of the second balanced detector 7, and the third interference optical signal enters the other photoelectric detector of the second balanced detector 7 after passing through the second circulator 3. The second differential current signal is generated after balanced detection, namely the quadrature component, which can be written as:

$$I_Q(t) = R[|E_{out3}(t)|^2 - |E_{out4}(t)|^2] = \frac{R}{2}|E(t)||E(t-\tau)|\sin(\omega\tau)$$

$$= \frac{R}{2}A(t)A(t-\tau)\sin(\omega\tau)$$

It can be seen that quadrature component based on self-interference of the signal output from the second balanced detector 7 is polarization-independent.

Finally, the electrical signal processing module 8 synthesizes the electrical signal in in-phase component and the electrical signal in quadrature component into a complex signal, which can be written as:

$$u(t) = I_I(t) + jI_Q(t) = \frac{R}{2}E(t)E^*(t-\tau)$$

The above complex signal is sampled and digitally processed by the electrical signal processing module 8, to restore the electric field information of the signal light, so as to obtain service data.

Figure 3A:
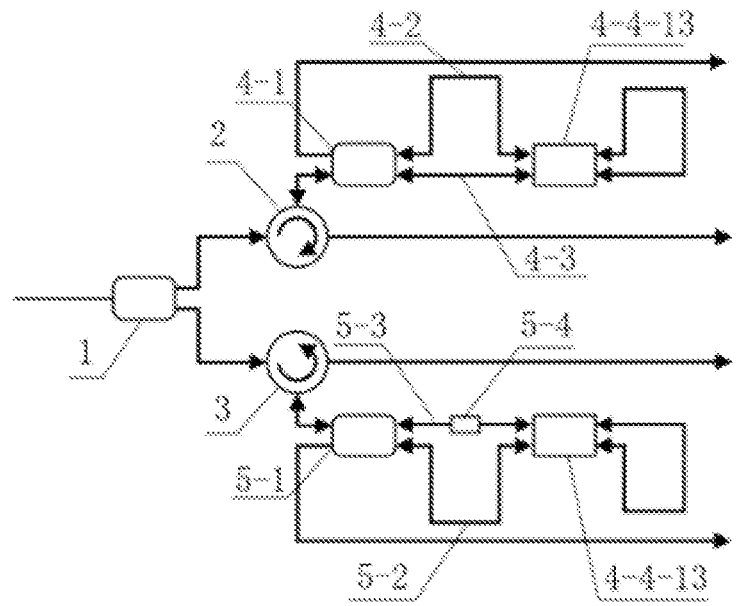
FIG. 3A is a schematic block diagram of the self-coherent receiver based on polarization-independent delay interferometers of Embodiment 2 of the present disclosure (optical part)

FIG. 3A shows Embodiment 2 of the self-coherent receiver based on polarization-independent delay interferometers of the present disclosure:

The self-coherent receiver based on polarization-independent delay interferometers is so configured, that the first polarization-independent delay interferometer 4 includes a second beam splitter 4-1, a first long-arm optical fiber 4-2, a first short-arm optical fiber 4-3 and a first reflection module.

The second beam splitter 4-1 is configured to split the input first signal light component, to generate a first long-arm component and a first short-arm component, which respectively enter the first long-arm optical fiber 4-2 and the first short-arm optical fiber 4-3.

The first reflection module is configured to respectively reflect the first long-arm component transmitted through the first long-arm optical fiber 4-2 and the first short-arm component transmitted through the first short-arm optical fiber 4-3, such that the horizontal polarization components and the vertical polarization components of the both are respectively rotated to be vertically polarized and horizontally polarized.

The second beam splitter 4-1 is further configured to interfere the reflected first long-arm component and first short-arm component, to generate a first interference optical signal and a second interference optical signal.

The second polarization-independent delay interferometer 5 includes a third beam splitter 5-1, a second long-arm optical fiber 5-2, a second short-arm optical fiber 5-3, a first phase shifter 5-4 and a second reflection module.

The third beam splitter 5-1 is configured to split the input second signal light component, to generate a second long-arm component and a second short-arm component, which respectively enter the second long-arm optical fiber 5-2 and the second short-arm optical fiber 5-3.

The second reflection module is configured to respectively reflect the second long-arm component transmitted through the second long-arm optical fiber 5-2 and the second short-arm component transmitted through the second short-arm optical fiber 5-3, such that the horizontal polarization components and the vertical polarization components of the both are respectively rotated to be vertically polarized and horizontally polarized.

The first phase shifter 5-4 is configured to adjust phase of the second short-arm component, so that a phase difference between it and the second long-arm component is $\pi/2$.

The third beam splitter 5-1 is further configured to interfere the reflected second long-arm component and second short-arm component, to generate a third interference optical signal and a fourth interference optical signal.

The first reflection module and the second reflection module each include a sixth Sagnac ring composed of a twentieth polarization beam splitter 4-4-13, wherein the first long-arm optical fiber 4-2, the first short-arm optical fiber 4-3, the second long-arm optical fiber 5-2 and the second short-arm optical fiber 5-3 are all polarization-maintaining optical fibers.

Two output ports of the twentieth polarization beam splitter 4-4-13 are connected directly through a polarization-maintaining optical fiber.

The sixth Sagnac ring is configured to reflect the optical signals input through two paths, such that the horizontal polarization components, vertical polarization components of the two-ways optical signals are respectively rotated to be vertical polarization components and horizontal polarization components correspondingly, and are still output from the corresponding input ports.

Figure 3B:
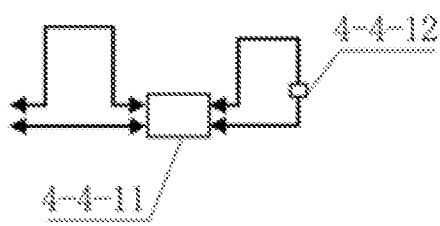
FIG. 3B is a schematic diagram of the first reflection module or the second reflection module of the self-coherent receiver based on polarization-independent delay interferometers of Embodiment 2 of the present disclosure.

FIG. 3B shows the first reflection module and the second reflection module of Embodiment 2. The first reflection module and the second reflection module are either a fifth Sagnac ring composed of a nineteenth polarization beam splitter 4-4-11 and a third 90° Faraday rotator 4-4-12.

Two output ports of the nineteenth polarization beam splitter 4-4-11 are respectively connected to the third 90° Faraday rotator through a polarization-maintaining fiber.

The fifth Sagnac ring is configured to reflect the optical signals input through two paths, such that the polarization states of the two-ways optical signals are rotated by 90° and are still output from the corresponding input ports.

The specific work process of Embodiment 2 includes:

The signal light received by the receiver E(t) first enters the first beam splitter 1 firstly and is split into the first signal light component $E_1(t)$ and the second signal light component $E_2(t)$, conforming to $$E_2(t) = E_2(t) = 1/\sqrt{2}\, E(t).$$

When the signal light reaches the receiver through the fiber channel, the polarization becomes random, which can be expressed as:

$$E(t) = A(t)e^{j(\omega t+\varphi_0)}\begin{bmatrix} \cos\theta \\ \sin\theta e^{j\delta} \end{bmatrix},$$

wherein θ is the angle between the horizontal polarization component and the vertical polarization component of the signal light, and δ is the phase difference between the both.

The first signal light component reaches the first beam splitter 4-1 after passing through the first circulator 2, the polarization state becomes:

$$E(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix},$$

and then is split by the second beam splitter 4-1 into a first split component $E_{11}(t)$ of the first signal light and a second split component $E_{12}(t)$ of the first signal light, which respectively enter the first long-arm optical fiber 4-2 and the first short-arm optical fiber 4-3 respectively, and then reach the two input ports of the twentieth polarization beam splitter 4-4-13 respectively.

Among them, a horizontal polarization component of $E_{11}(t)$ enters the sixth Sagnc ring and propagates counter-clockwise, and then is output from the original input port, the horizontal polarization is turned to a vertical polarization, that is to say the polarization is rotated by 90° after reflection. A vertical polarization component of $E_{11}(t)$ enters the sixth Sagnc ring and propagates clockwise, and then is output from the original input port, the vertical polarization is turned to a horizontal polarization, that is to say the polarization is rotated by 90° after reflection. The both reach the first beam splitter 4-1 through the first long-arm optical fiber 4-2 again after they are output from the same input port of the twentieth polarization beam splitter 4-4-13, the polarization state is turned to:

$$E'_{11}(t) = \frac{A(t)e^{j(\omega t+\varphi_0)}}{2}\begin{bmatrix} \sin\theta_1 e^{j\delta_1} \\ \cos\theta_1 \end{bmatrix},$$

Similarly, a horizontal polarization component of $E_{12}(t)$ enters the sixth Sagnc ring and propagates counterclockwise, and then is output from the original input port, the horizontal polarization is turned to a vertical polarization, that is to say the polarization is rotated by 90° after reflection. A vertical polarization component of $E_{12}(t)$ enters the sixth Sagnc ring and propagates clockwise, and then is output from the original input port, the vertical polarization is turned to a horizontal polarization, that is to say the polarization is rotated by 90° after reflection.

Optionally, the sixth Sagnac ring can be replaced by the fifth Sagnac ring composed of the nineteenth polarization beam splitter 4-4-11 and the third 90° Faraday rotator 4-4-12, as shown in FIG. 3B.

An optical signal of arbitrary polarization enters one input port of the nineteenth polarization beam splitter 4-4-11, a horizontal polarization component is transmitted to its one output port, propagates counterclockwise along the fifth Sagnac ring, its polarization is rotated by 90° when passing through the third 90° Faraday rotator 4-4-6, afterwards it reaches the other output port of the nineteenth polarization beam splitter 4-4-11 and is output from the input port input by it and is turned to be vertically polarized.

A vertical polarization component of the optical signal is reflected to the other output port of the nineteenth polarization beam splitter 4-4-11, propagates clockwise along the fifth Sagnac ring, its polarization is rotated by 90° when passing through the third 90° Faraday rotator 4-4-12, afterwards it reaches the one output port of the nineteenth polarization beam splitter 4-4-11, is output from the input port thereof and is turned to be horizontally polarized.

Another optical signal of arbitrary polarization enters the other input port of the nineteenth polarization beam splitter 4-4-11, a horizontal polarization component is reflected to its one output port, propagates counterclockwise along the fifth Sagnac ring, its polarization is rotated by 90° when passing through the third 90° Faraday rotator 4-4-12, afterwards it reaches the other output port of the nineteenth polarization beam splitter 4-4-11 and is output from the input port input by it and is turned to be vertically polarized.

A vertical polarization component of the another optical signal is transmitted to the other output port of the nineteenth polarization beam splitter 4-4-11, propagates clockwise along the fifth Sagnac ring, its polarization is rotated by 90° when passing through the third 90° Faraday rotator 4-4-12, afterwards it reaches the one output port of the nineteenth polarization beam splitter 4-4-11, is output from the input port thereof and is turned to be horizontally polarized.

Therefore, the overall effect of the fifth Sagnac ring is to rotate the polarization of the input signal light of arbitrary polarization by 90° and reflect and output it, which is equivalent to the sixth Sagnac ring.

$E_{11}(t)$ and $E_{12}(t)$ reach the second beam splitter 4-1 again through the first short-arm optical fiber 4-3 after being output from the same input port of the twentieth polarization beam splitter 4-4-13, the polarization state is turned to:

$$E'_{12}(t-\tau) = \frac{A(t-\tau)e^{j(\omega(t-\tau)+\varphi_0)}}{2}\begin{bmatrix} \sin\theta_1 e^{j\delta_1} \\ \cos\theta_1 \end{bmatrix},$$

It can be seen that $E'_{11}(t)$ and $E'_{12}(t-\tau)$ have the same polarization, they interfere with each other at the second beam splitter 4-1, such that the first interference optical signal $E_{out1}(t)$ and the second interference optical signal $E_{out2}(t)$ are generated, which can written as:

$$E_{out1}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix}$$

$$E_{out2}(t) = \frac{e^{j(\omega t+\varphi_0)}}{2\sqrt{2}}[A(t)-A(t-\tau)e^{-j\omega\tau}]\begin{bmatrix} \sin\theta_1 e^{j\delta_1} \\ \cos\theta_1 \end{bmatrix}$$

wherein τ is the delay corresponding to the arm length difference between the long arm and the short arm of the first polarization-independent delay interferometer 4.

The second interference optical signal directly enters one photoelectric detector of the first balanced detector 6, and the first interference optical signal enters the other photoelectric detector of the first balanced detector 6 after passing through the first circulator 2. The first differential current signal is generated after balanced detection, namely the in-phase component, which can be written as:

$$I_I(t) = R\big[|E_{out1}(t)|^2 - |E_{out2}(t)|^2\big] = \frac{R}{2}|E(t)||E(t-\tau)|\cos(\omega\tau)$$
$$= \frac{R}{2}A(t)A(t-\tau)\cos(\omega\tau)$$

among them, R is the response efficiency of the photoelectric detector, and ω is the angular frequency of the signal light. It can be seen that the in-phase component based on self-interference of the signal output from the first balanced detector 6 is polarization-independent.

The second signal light component reaches the third beam splitter 5-1 after passing through the second circulator 3, the third interference optical signal $E_{out3}(t)$ and the fourth interference optical signal $E_{out4}(t)$ are generated after undergoing a similar polarization-independent delayed interference as the first signal light component. Because the first phase shifter 5-4 ensures the phase difference between the long arm and the short arm is π/2, the both can be respectively written as:

$$E_{out3}(t) = \frac{e^{j(\omega t+\varphi_0)}}{2\sqrt{2}}\big[A(t) + jA(t-\tau)e^{-j\omega t}\big]\begin{bmatrix}\sin\theta_2 e^{j\delta_2}\\\cos\theta_2\end{bmatrix}$$

$$E_{out4}(t) = \frac{e^{j(\omega t+\varphi_0)}}{2\sqrt{2}}\big[A(t) - jA(t-\tau)e^{-j\omega t}\big]\begin{bmatrix}\sin\theta_2 e^{j\delta_2}\\\cos\theta_2\end{bmatrix}$$

wherein τ is the delay corresponding to the arm length difference between the long arm and the short arm of the second polarization-independent delay interferometer 5.

The fourth interference optical signal directly enters one photoelectric detector of the second balanced detector 7, and the third interference optical signal enters the other photoelectric detector of the second balanced detector 7 after passing through the second circulator 3. The second differential current signal is generated after balanced detection, namely the quadrature component, which can be written as:

$$I_Q(t) =$$
$$R\big[|E_{out3}(t)|^2 - |E_{out4}(t)|^2\big] = \frac{R}{2}|E(t)||E(t-\tau)|\sin(\omega\tau) = \frac{R}{2}A(t)A(t-\tau)\sin(\omega\tau)$$

It can be seen that quadrature component based on self-interference of the signal output from the second balanced detector 7 is polarization-independent.

Finally, the electrical signal processing module 8 synthesizes the electrical signal in in-phase component and the electrical signal in quadrature component into a complex signal, which can be written as:

$$u(t) = I_I(t) + jI_Q(t) = \frac{R}{2}E(t)E^*(t-\tau)$$

The above complex signal is sampled and digitally processed by the electrical signal processing module 8, to restore the electric field information of the signal light, so as to obtain service data.

Figure 4A:
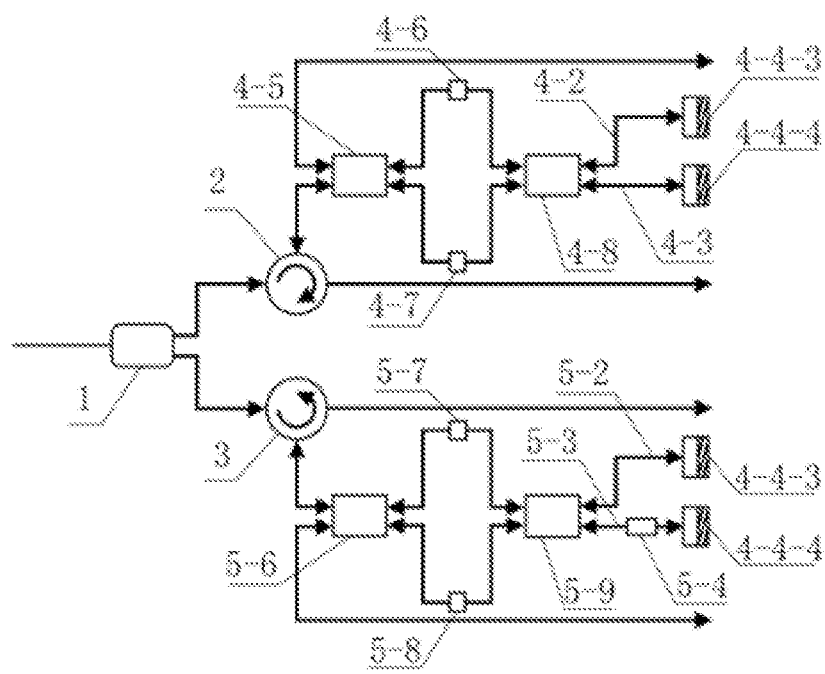
FIG. 4A is a schematic block diagram of the self-coherent receiver based on polarization-independent delay interferometers of Embodiment 3 of the present disclosure (optical part)

FIG. 4A shows the self-coherent receiver based on polarization-independent delay interferometers of Embodiment 3 of the present disclosure:

The self-coherent receiver based on polarization-independent delay interferometers is so configured, that the first polarization-independent delay interferometer 4 includes a first polarization beam splitter 4-5, a first 45° polarization-rotation structure 4-6, a second 45° polarization-rotation structure 4-7, a second polarization beam splitter 4-8, a first long-arm optical fiber 4-2, a first short-arm optical fiber 4-3 and a first reflection module.

The first polarization beam splitter 4-5 is configured to split the first signal light component to a first polarized signal light component and a second polarized signal light component.

The first 45° polarization-rotation structure 4-6 and the second 45° polarization-rotation structure 4-7 are respectively configured to rotate the polarization state of the first polarized signal light component and the second polarized signal light component by 45° correspondingly.

The second polarization beam splitter 4-8 is configured to transmit a horizontal polarization component of the first polarized signal light component to the first long-arm optical fiber 4-2 while reflect a vertical polarization component thereof to the first short-arm optical fiber 4-3; and to reflect a horizontal polarization component of the second polarized signal light component to the first long-arm optical fiber 4-2 while transmit a vertical polarization component thereof to the first short-arm optical fiber 4-3.

The first reflection module is configured to respectively reflect the horizontal polarization component of the first polarized signal light component transmitted through the first long-arm optical fiber 4-2 and the vertical polarization component of the first polarized signal light component transmitted through the first short-arm optical fiber 4-3, such that the polarization states of the both are rotated by 90°; and to respectively reflect the horizontal polarization component of the second polarized signal light component transmitted through the first long-arm optical fiber 4-2 and the vertical polarization component of the second polarized signal light component transmitted through the first short-arm optical fiber 4-3, such that the polarization states of the both are rotated by 90°.

The second polarization beam splitter 4-8 is further configured for polarization interference of the horizontal polarization component and the vertical polarization component of the reflected first polarization signal, to generate a first polarization interference optical signal, and for polarization interference of the horizontal polarization component and the vertical polarization component of the reflected second polarization signal, to generate a second polarization interference optical signal.

The first 45° polarization-rotation structure 4-6 and the second 45° polarization-rotation structure 4-7 are also respectively configured to rotate the polarization state of the second polarized signal light component and the first polarized signal light component by 45° correspondingly.

The first polarization beam splitter 4-5 is further configured to combine the horizontal polarization component of the first polarization interference optical signal component and the horizontal polarization component of the second polarization interference optical signal component, to generate a first interference optical signal; and to combine the vertical polarization component of the first polarization interference optical signal component and the vertical polarization component of the second polarization interference optical signal component, to generate a second interference optical signal.

The second polarization-independent delay interferometer 5 includes a third polarization beam splitter 5-6, a third 45° polarization-rotation structure 5-7, a fourth 45° polarization-rotation structure 5-8, a fourth polarization beam splitter 5-9, a second long-arm optical fiber 5-2, a second short-arm optical fiber 5-3, a first phase shifter 5-4 and a second reflection module.

The third polarization beam splitter 5-6 is configured to split the second signal light component to a third polarized signal light component and a fourth polarized signal light component.

The third 45° polarization-rotation structure 5-7 and the fourth 45° polarization-rotation structure 5-8 are respectively configured to rotate the polarization states of the third polarized signal light component and the fourth polarized signal light component by 45° correspondingly.

The fourth polarization beam splitter 5-9 is configured to transmit a horizontal polarization component of the third polarized signal light component to the second long-arm optical fiber 5-2 while reflect a vertical polarization component thereof to the second short-arm optical fiber 5-3; and to reflect a horizontal polarization component of the fourth polarized signal light component to the second long-arm optical fiber 5-2 while transmit a vertical polarization component thereof to the second short-arm optical fiber 5-3.

The second reflection module is configured to respectively reflect the horizontal polarization component of the third polarized signal light component transmitted through the second long-arm optical fiber 5-2 and the vertical polarization component of the third polarized signal light component transmitted through the second short-arm optical fiber 5-3, such that the polarization states of the both are rotated by 90°; and to respectively reflect the horizontal polarization component of the fourth polarized signal light component transmitted through the second long-arm optical fiber 5-2 and the vertical polarization component of the fourth polarized signal light component transmitted through the second short-arm optical fiber 5-3, such that the polarization states of the both are rotated by 90°.

The first phase shifter 5-4 is configured to adjust phase of the optical signal through the second short-arm optical fiber 5-3, so that a phase difference between it and the optical signal through the second long-arm optical fiber 5-2 is π/2.

The fourth polarization beam splitter 5-9 is further configured for polarization interference of the horizontal polarization component and the vertical polarization component of the reflected third polarization interference signal light component, to generate a third polarization interference optical signal, and for polarization interference of the horizontal polarization component and the vertical polarization component of the reflected fourth polarization interference signal light component, to generate a fourth polarization interference optical signal.

The third 45° polarization-rotation structure 5-7 and the fourth 45° polarization-rotation structure 5-8 are also respectively configured to rotate the polarization state of the fourth polarization interference optical signal and the third polarization interference optical signal by 45° correspondingly.

The third polarization beam splitter 5-6 is further configured to combine the horizontal polarization component of the third polarization interference optical signal and the horizontal polarization component of the fourth polarization interference optical signal, to generate a third interference optical signal; and to combine the vertical polarization component of the third polarization interference optical signal and the vertical polarization component of the fourth polarization interference optical signal, to generate a fourth interference optical signal.

The first reflection module and the second reflection module each include first quarter-wave mirrors 4-4-3 and second quarter-wave mirrors 4-4-4, wherein the first long-arm optical fiber 4-2, the first short-arm optical fiber 4-3 and the second long-arm optical fiber 5-2 and the second short-arm optical fiber are all polarization-maintaining optical fibers.

The first quarter-wave mirrors 4-4-3 and second quarter-wave mirrors 4-4-4 each are composed of a quarter-wave plate and a reflector, wherein an angle between a main axis of the quarter-wave plate and the horizontal direction is 45°. The both are respectively configured to reflect the input optical signal, such that the horizontal polarization component and the vertical polarization component thereof are respectively rotated to be a vertical polarization component and a horizontal polarization component.

Figure 4B:
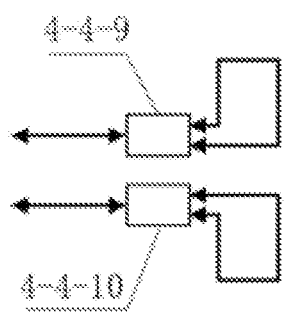
FIG. 4B is a schematic diagram of the first reflection module or the second reflection module of the self-coherent receiver based on polarization-independent delay interferometers of Embodiment 3 of the present disclosure.

FIG. 4B shows the first reflection module and the second reflection module of Embodiment 3. The first reflection module and the second reflection module are either a third Sagnac ring composed of a seventeenth polarization beam splitter 4-4-9 or a fourth Sagnac ring composed of an eighteenth polarization beam splitter 4-4-10, wherein the first long-arm optical fiber 4-2, the first short-arm optical fiber 4-3, the second long-arm optical fiber 5-2 and the second short-arm optical fiber 5-3 are all polarization-maintaining optical fibers.

Two output ports of the seventeenth polarization beam splitter 4-4-9 are directly connected through a polarization-maintaining fiber; two output ports of the eighteenth polarization beam splitter 4-4-10 are directly connected through a polarization-maintaining fiber.

The third Sagnac ring 4-4-5 and the fourth Sagnac ring 4-4-6 are respectively configured to reflect the input optical signal, such that its horizontal polarization component and vertical polarization component are respectively rotated to be a vertical polarization component and a horizontal component.

The specific work process of Embodiment 3 includes:

The signal light received by the receiver E(t) first enters the first beam splitter 1 and is split into the first signal light component $E_1(t)$ and the second signal light component $E_2(t)$, conforming to $$E_1(t) = E_2(t) = 1/\sqrt{2}\, E(t).$$

When the signal light reaches the receiver through the fiber channel, the polarization becomes random, which can be expressed as:

$$E(t) = A(t)e^{j(\omega t + \varphi_0)}\begin{bmatrix} \cos\theta \\ \sin\theta e^{j\delta} \end{bmatrix},$$

wherein θ is the angle between the horizontal polarization component and the vertical polarization component of the signal light, and δ is the phase difference between the both.

Before the first signal light component reaches the first polarization beam splitter 4-5 through the first circulator 2, the polarization state becomes:

$$E_1(t) = \frac{A(t)e^{j(\omega t + \varphi_0)}}{\sqrt{2}}\begin{bmatrix} \cos\theta_1 \\ \sin\theta_1 e^{j\delta_1} \end{bmatrix},$$

and then is split by the first polarization beam splitter 4-5 into a first polarized signal light component $E_{11}(t)$ and a second polarized signal light component $E_{12}(t)$. The polarization state of $E_{11}(t)$ after passing through the first 45° polarization-rotation structure 4-6 becomes:

$$E_{11}(t) = \frac{A(t)e^{j(\omega t + \varphi_0)}}{2}\begin{bmatrix}\cos\theta_1\\\cos\theta_1\end{bmatrix},$$

and then is polarization-split by the second polarization beam splitter 4-8, to generate two polarization components, which respectively enter into the first long-arm optical fiber 4-2 and the first short-arm optical fiber 4-3, and then respectively reach the first quarter-wave mirrors 4-4-3 and the second quarter-wave mirrors 4-4-4.

Since the angle between the main axis of the quarter-wave plate and the horizontal direction is 45°, the quarter-wave mirrors can be obtained when jointing the quarter-wave plate with a reflector. The corresponding transmission matrix is:

$$T_{QM} = \begin{bmatrix}0 & 1\\1 & 0\end{bmatrix},$$

It can be seen that for the horizontally polarized optical signal, its polarization state would be turned to be vertically polarized after being reflected by the quarter-wave mirrors, and vertical polariation would be turned to be horizontally polarized.

Optionally, the first quarter-wave mirrors 4-4-3 and the second quarter-wave mirrors 4-4-4 can be replaced by the third Sagnac ring composed of the seventeenth polarization beam splitter 4-4-9 and the fourth Sagnac ring composed of the eighteenth polarization beam splitter 4-4-10 respectively, as shown in FIG. 4B.

Taking the third Sagnac ring as an example, an optical signal of arbitrary polarization enters the input port of the seventeenth polarization beam splitter 4-4-9, a horizontal polarization component is transmitted to its one output port, propagates counterclockwise along the slow axis of the polarization-maintaining fiber in the third Sagnac ring, reaches the other output port of the seventeenth polarization beam splitter 4-4-9, is output from its input port, and is turned to be vertically polarized.

A vertical polarization component of the optical signal is reflected to the other output port of the seventeenth polarization beam splitter 4-4-9, propagates clockwise along the slow axis of the polarization-maintaining fiber in the first Sagnac ring, reaches the one output port of the seventeenth polarization beam splitter 4-4-9, is output from its input port, and is turned to be horizontally polarized.

Therefore, the overall effect of the third Sagnac ring is to respectively reflect arbitrary input polarization, and rotate its horizontal polarization component, vertical polarization component to be a vertical polarization component, a horizontal polarization component, correspondingly, which is equivalent to the quarter-wave mirrors.

Two polarization components of $E_{11}(t)$ enter respectively the first long-arm optical fiber 4-2 and the first short-arm optical fiber 4-3, and are respectively reflected by the first quarter-wave mirrors 4-4-3 and the second quarter-wave mirrors 4-4-4, afterwards return to the second polarization splitter 4-8 to undergo a polarization-dependent combining-interference after again respectively passing through the first long-arm optical fiber 4-2 and the first short-arm optical fiber 4-3, to generate a first polarization interference optical signal, whose polarization state is:

$$E_{11out}(t) = \frac{e^{j(\omega t + \varphi_0)}\cos\theta_1}{2}\begin{bmatrix}A(t)\\A(t-\tau)e^{-j\omega\tau}\end{bmatrix},$$

after the second 45° polarization-rotation structure 4-3-7 is turned to:

$$E_{11out}(t) = \frac{e^{j(\omega t + \varphi_0)}\cos\theta_1}{2\sqrt{2}}\begin{bmatrix}A(t) + A(t-\tau)e^{-j\omega\tau}\\A(t) - A(t-\tau)e^{-j\omega\tau}\end{bmatrix},$$

The polarization state of $E_{12}(t)$ after passing through the second 45° polarization-rotation structure 4-3-7 is turned to:

$$E_{12}(t) = \frac{A(t)e^{j(\omega t + \varphi_0)}}{2}\begin{bmatrix}\sin\theta_1 e^{j\delta_1}\\\sin\theta_1 e^{j\delta_1}\end{bmatrix},$$

and then is polarization-split by the second polarization beam splitter 4-8 into two polarization components, which respectively enter the first long-arm optical fiber 4-2 and the first short-arm optical fiber 4-3, and then respectively reach the second quarter-wave mirrors 4-4-4 and the second quarter-wave mirrors 4-4-4, return to the second polarization beam splitter 4-8 again respectively through the first long-arm optical fiber 4-2 and the first short-arm optical fiber 4-3 after reflection, to undergo a polarization-dependent combining-interference, so as to generate a second polarization interference, optical signal, whose, polarization state is:

$$E_{12out}(t) = \frac{e^{j(\omega t + \varphi_0)}\sin\theta_1 e^{j\delta_1}}{2}\begin{bmatrix}A(t)\\A(t-\tau)e^{-j\omega\tau}\end{bmatrix}, :$$

which after passing through the first 45° polarization-rotation structure 4-6 is turned to:

$$E_{12out}(t) = \frac{e^{j(\omega t + \varphi_0)}\sin\theta_1 e^{j\delta_1}}{2\sqrt{2}}\begin{bmatrix}A(t) + A(t-\tau)e^{-j\omega\tau}\\A(t) - A(t-\tau)e^{-j\omega\tau}\end{bmatrix},$$

The horizontal polarization component of the first polarization interference optical signal $E_{11out}(t)$ and the horizontal polarization component of the second polarization interference optical signal $E_{12out}(t)$ are simultaneously output from one input port of the first polarization beam splitter 4-5 and combined to the first interference optical signal:

$$E_{out1}(t) = \frac{e^{j(\omega t + \varphi_0)}}{2\sqrt{2}}[A(t) + A(t-\tau)e^{-j\omega\tau}]\begin{bmatrix}\sin\theta_1 e^{j\delta_1}\\\cos\theta_1\end{bmatrix}$$

The vertical polarization component of the first polarization interference optical signal $E_{11out}(t)$ and the vertical polarization component of the second polarization interference optical signal $E_{12out}(t)$ are simultaneously output from the other input port of the first polarization beam splitter 4-5 and combined to the second interference optical signal:

$$E_{out2}(t) = \frac{e^{j(\omega t+\varphi_0)}}{2\sqrt{2}}[A(t) - A(t-\tau)e^{-j\omega\tau}]\begin{bmatrix}\sin\theta_1 e^{j\delta_1}\\ \cos\theta_1\end{bmatrix}$$

The second interference optical signal directly enters one photoelectric detector of the first balanced detector 6, while the first interference optical signal enters the other photoelectric detector of the first balanced detector 6 after passing through the first circulator 2. The first differential current signal is generated after balanced detection, namely the in-phase component, which can be written as:

$$I_I(t) = R[|E_{out1}(t)|^2 - |E_{out2}(t)|^2] = \frac{R}{2}|E(t)||E(t-\tau)|\cos(\omega\tau) = \frac{R}{2}A(t)A(t-\tau)\cos(\omega\tau)$$

among them, R is the response efficiency of the photoelectric detector, and ω is the angular frequency of the signal light. It can be seen that the in-phase component based on self-interference of the signal output from the first balanced detector 6 is polarization-independent.

The second signal light component reaches the second polarization beam splitter 5-6 after passing through the second circulator 3 and goes through a similar polarization-independent delayed self-interference as the first signal light component, to generate a third interference optical signal $E_{out3}(t)$ and a fourth interference optical signal $E_{out4}(t)$. Because the first phase shifter 5-4 ensures the phase difference between the long arm and the short arm is π/2, the both can be respectively written as:

$$E_{out3}(t) = \frac{e^{j(\omega t+\varphi_0)}}{2\sqrt{2}}[A(t) + jA(t-\tau)e^{-j\omega\tau}]\begin{bmatrix}\sin\theta_2 e^{j\delta_2}\\ \cos\theta_2\end{bmatrix}$$

$$E_{out4}(t) = \frac{e^{j(\omega t+\varphi_0)}}{2\sqrt{2}}[A(t) + jA(t-\tau)e^{-j\omega\tau}]\begin{bmatrix}\sin\theta_2 e^{j\delta_2}\\ \cos\theta_2\end{bmatrix}$$

wherein, τ is the delay corresponding to the arm length difference between the long arm and the short arm of the second polarization-independent delay interferometer 5.

The fourth interference optical signal directly enters one photoelectric detector of the second balanced detector 7, and the third interference optical signal enters the other photoelectric detector of the second balanced detector 7 after passing through the second circulator 3. The second differential current signal is generated after balanced detection, namely the quadrature component, which can be written as:

$$I_Q(t) = R[|E_{out3}(t)|^2 - |E_{out4}(t)|^2] = \frac{R}{2}|E(t)||E(t-\tau)|\sin(\omega\tau) = \frac{R}{2}A(t)A(t-\tau)\sin(\omega\tau)$$

It can be seen that quadrature component based on self-interference of the signal output from the second balanced detector 7 is polarization-independent.

Finally, the electrical signal processing module 8 synthesizes the electrical signal in in-phase component and the electrical signal in quadrature component into a complex signal, which can be written as:

$$u(t) = I_I(t) + jI_Q(t) = \frac{R}{2}E(t)E^*(t-\tau)$$

The above complex signal is sampled and digitally processed by the electrical signal processing module 8, to restore the electric field information of the signal light, so as to obtain service data.

Figure 5:
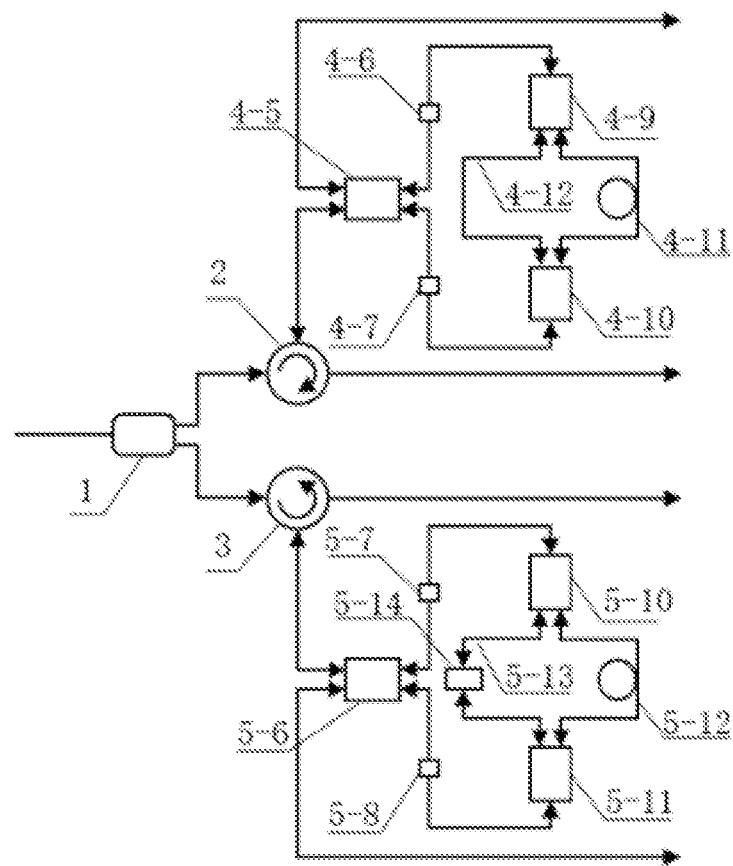
FIG. 5 is a schematic block diagram of the self-coherent receiver based on polarization-independent delay interferometers of Embodiment 4 of the present disclosure (optical part)

FIG. 5 shows the self-coherent receiver based on polarization-independent delay interferometers of Embodiment 4 of the present disclosure:

The self-coherent receiver based on polarization-independent delay interferometers is so configured, that the first polarization-independent delay interferometer 4 includes a first polarization beam splitter 4-5, a first 45° polarization-rotation structure 4-6, a second 45° polarization-rotation structure 4-7, a fifth polarization beam splitter 4-9, a sixth polarization beam splitter 4-10, a third long-arm optical fiber 4-11 and a third short-arm optical fiber 4-12.

The first polarization beam splitter 4-5 is configured to split the first signal light component to a first polarized signal light component and a second polarized signal light component.

The first 45° polarization-rotation structure 4-6 and the second 45° polarization-rotation structure 4-7 are respectively configured to rotate the polarization states of the first polarized signal light component and the second polarized signal light component by 45° correspondingly.

The fifth polarization beam splitter 4-9 is configured to transmit a horizontal polarization component of the first polarized signal light component to the third short-arm optical fiber 4-12 while reflect a vertical polarization component thereof to the third long-arm optical fiber 4-11; the sixth polarization beam splitter 4-10 is configured to transmit a horizontal polarization component of the second polarized signal light component to the third short-arm optical fiber 4-12 while reflect a vertical polarization component thereof to the third long-arm optical fiber 4-11.

The sixth polarization beam splitter 4-10 is further configured for polarization interference of the horizontal polarization component of the first polarized signal light component transmitted by the third short-arm optical fiber 4-12 and the vertical polarization component of the first polarized signal light component transmitted by the third long-arm optical fiber 4-11, to generate a first polarization interference optical signal. The fifth polarization beam splitter 4-9 is further configured for polarization interference of the horizontal polarization component of the second polarized signal light component transmitted by the third short-arm optical fiber 4-12 and the vertical polarization component of the second polarized signal light component transmitted by the third long-arm optical fiber 4-11, to generate a second polarization interference optical signal.

The first 45° polarization-rotation structure 4-6 and the second 45° polarization-rotation structure 4-7 are also respectively configured to rotate the polarization states of the second polarization interference optical signal and the first polarization interference optical signal by 45° correspondingly.

The first polarization beam splitter 4-5 is further configured to combine the horizontal polarization component of the first polarization interference optical signal and the horizontal polarization component of the second polarization interference optical signal, to generate a first interference optical signal; and to combine the vertical polarization component of the first polarization interference optical signal and the vertical polarization component of the second polarization interference optical signal, to generate a second interference optical signal.

The second polarization-independent delay interferometer 5 includes a third polarization beam splitter 5-6, a third 45° polarization-rotation structure 5-7, a fourth 45° polarization-rotation structure 5-8, a seventh polarization beam splitter 5-10, an eighth polarization beam splitter 5-11, a fourth long-arm optical fiber 5-12, a fourth short-arm optical fiber 5-13 and a second phase shifter 5-14.

The third polarization beam splitter 5-6 is configured to split the second signal light component to a third polarized signal light component and a fourth polarized signal light component.

The third 45° polarization-rotation structure 5-7 and the fourth 45° polarization-rotation structure 5-8 are respectively configured to rotate the polarization states of the third polarized signal light component and the fourth polarized signal light component by 45° correspondingly.

The seventh polarization beam splitter 5-10 is configured to transmit a horizontal polarization component of the third polarized signal light component to the fourth short-arm optical fiber 5-13 while reflect a vertical polarization component thereof to the fourth long-arm optical fiber 5-12. The eighth polarization beam splitter 5-11 is configured to transmit a horizontal polarization component of the fourth polarized signal light component to the fourth short-arm optical fiber 5-13 while reflect a vertical polarization component thereof to the fourth long-arm optical fiber 5-12.

The second phase shifter 5-14 is configured to adjust phase of the optical signal passing the fourth short-arm optical fiber 5-13, so that a phase difference between it and the optical signal passing the fourth long-arm optical fiber 5-12 is $\pi/2$.

The eighth polarization beam splitter 5-11 is further configured for polarization interference of the horizontal polarization component of the third polarized signal light component transmitted by the fourth short-arm optical fiber 5-13 and the vertical polarization component of the third polarized signal light component transmitted by the fourth long-arm optical fiber 5-12, to generate a third polarization interference optical signal. The seventh polarization beam splitter 5-9 is further configured for polarization interference of the horizontal polarization component of the fourth polarized signal light component transmitted by the fourth short-arm optical fiber 5-13 and the vertical polarization component of the fourth polarized signal light component transmitted by the fourth long-arm optical fiber 5-12, to generate a fourth polarization interference optical signal.

The third 45° polarization-rotation structure 5-7 and the fourth 45° polarization-rotation structure 5-8 are also respectively configured to rotate the polarization states of the fourth polarization interference optical signal and the third polarization interference optical signal by 45° correspondingly.

The third polarization beam splitter 5-6 is further configured to combine the horizontal polarization component of the third polarization interference optical signal and the horizontal polarization component of the fourth polarization interference optical signal, to generate a third interference optical signal; and to combine the vertical polarization component of the third polarization interference optical signal and the vertical polarization component of the fourth polarization interference optical signal, to generate a fourth interference optical signal.

The specific work process of Embodiment 4 includes:

The signal light received by the receiver E(t) first enters the first beam splitter 1 and is split into the first signal light component $E_1(t)$ and the second signal light component $E_2(t)$, conforming to $$E_1(t) = E_2(t) = 1/\sqrt{2}\, E(t).$$

Since the signal light reaches the receiver through the fiber channel, the polarization becomes random, which can be expressed as:

$$E(t) = A(t)e^{j(\omega t+\varphi_0)}\begin{bmatrix}\cos\theta\\ \sin\theta e^{j\delta}\end{bmatrix},$$

wherein $\theta$ is the angle between the horizontal polarization component and the vertical polarization component of the signal light, and $\delta$ is the phase difference between the both.

Before the first signal light component reaches the first polarization beam splitter 4-5 through the first circulator 2, the polarization state is turned to:

$$E_1(t) = \frac{A(t)e^{j(\omega t+\varphi_0)}}{\sqrt{2}}\begin{bmatrix}\cos\theta_1\\ \sin\theta_1 e^{j\delta_1}\end{bmatrix},$$

and then is polarization-split by the first polarization beam splitter 4-5 into a first polarized signal light component $E_{11}(t)$ and a second polarized signal light component $E_{12}(t)$. The polarization state of $E_{11}(t)$ after passing through the first 45° polarization-rotation structure 4-6 is turned to:

$$E_{11}(t) = \frac{A(t)e^{j(\omega t+\varphi_0)}}{2}\begin{bmatrix}\cos\theta_1\\ \cos\theta_1\end{bmatrix},$$

and then is polarization-split after reaching the fifth polarization beam splitter 4-9, wherein the horizontal polarization component is transmitted to the third short-arm optical fiber 4-12 while the vertical polarization component is reflected to the third long-arm optical fiber 4-11, and then the both undergo a polarization interference at the sixth polarization beam splitter 4-10, to generate a first polarization interference optical signal, whose polarization state is:

$$E_{11out}(t) = \frac{e^{j(\omega t+\varphi_0)}\cos\theta_1}{2}\begin{bmatrix}A(t)\\ A(t-\tau)e^{-j\omega\tau}\end{bmatrix},$$

and after passing through the second 45° polarization-rotation structure 4-7 is turned to:

$$E_{11out}(t) = \frac{e^{j(\omega t+\varphi_0)}\cos\theta_1}{2\sqrt{2}}\begin{bmatrix}A(t)+A(t-\tau)e^{-j\omega\tau}\\ A(t)-A(t-\tau)e^{-j\omega\tau}\end{bmatrix},$$

The polarization state of $E_{12}(t)$ after passing through the second 45° polarization-rotation structure 4-7 is turned to:

$$E_{12}(t) = \frac{A(t)e^{j(\omega t+\varphi_0)}}{2}\begin{bmatrix} \sin\theta_1 e^{j\delta_1} \\ \sin\theta_1 e^{j\delta_1} \end{bmatrix},$$

and then is polarization-split by the sixth polarization beam splitter 4-10, wherein the horizontal polarization component is transmitted to the third short-arm optical fiber 4-12 while the vertical polarization component is reflected to the third long-arm optical fiber 4-11, and then undergo a polarization interference at the fifth polarization beam splitter 4-9, to generate a second polarization interference optical signal, whose polarization state is:

$$E_{12out}(t) = \frac{e^{j(\omega t+\varphi_0)}\sin\theta_1 e^{j\delta_1}}{2}\begin{bmatrix} A(t) \\ A(t-\tau)e^{-j\omega\tau} \end{bmatrix},$$

which after passing through the first 45° polarization-rotation structure 4-6 is turned to:

$$E_{12out}(t) = \frac{e^{j(\omega t+\varphi_0)}\sin\theta_1 e^{j\delta_1}}{2\sqrt{2}}\begin{bmatrix} A(t)+A(t-\tau)e^{-j\omega\tau} \\ A(t)-A(t-\tau)e^{-j\omega\tau} \end{bmatrix},$$

The horizontal polarization component of the first polarization interference optical signal $E_{11out}(t)$ and the horizontal polarization component of the second polarization interference optical signal $E_{12out}(t)$ are simultaneously output from one input port of the first polarization beam splitter 4-5 and combined to the first interference optical signal:

$$E_{out1}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix}$$

The vertical polarization component of the first polarization interference optical signal $E_{11out}(t)$ and the vertical polarization component of the second polarization interference optical signal $E_{12out}(t)$ are simultaneously output from the other input port of the first polarization beam splitter 4-5 and combined to the second interference optical signal:

$$E_{out2}(t) = \frac{e^{j(\omega t+\varphi_0)}}{2\sqrt{2}}[A(t)-A(t-\tau)e^{-j\omega\tau}]\begin{bmatrix} \sin\theta_1 e^{j\delta_1} \\ \cos\theta_1 \end{bmatrix}$$

The second interference optical signal directly enters one photoelectric detector of the first balanced detector 6, while the first interference optical signal enters the other photoelectric detector of the first balanced detector 6 after passing through the first circulator 2. The first differential current signal is generated after balanced detection, namely the in-phase component, which can be written as:

$$I_I(t) = R[|E_{out1}(t)|^2 - |E_{out2}(t)|^2] = \frac{R}{2}|E(t)||E(t-\tau)|\cos(\omega\tau)$$

$$= \frac{R}{2}A(t)A(t-\tau)\cos(\omega\tau)$$

among them, R is the response efficiency of the photoelectric detector, and ω is the angular frequency of the signal light. It can be seen that the in-phase component based on self-interference of the signal output from the first balanced detector 6 is polarization-independent.

The second signal light component reaches the second polarization beam splitter 5-6 after passing through the second circulator 3 and goes through a similar polarization-independent delayed self-interference as the first signal light component, to generate a third interference optical signal $E_{out3}(t)$ and a fourth interference optical signal $E_{out4}(t)$. Because the second phase shifter 5-14 ensures the phase difference between the long arm and the short arm is π/2, the both can be respectively written as:

$$E_{out3}(t) = \frac{e^{j(\omega t+\varphi_0)}}{2\sqrt{2}}[A(t)+jA(t-\tau)e^{-j\omega\tau}]\begin{bmatrix} \sin\theta_2 e^{j\delta_2} \\ \cos\theta_2 \end{bmatrix}$$

$$E_{out4}(t) = \frac{e^{j(\omega t+\varphi_0)}}{2\sqrt{2}}[A(t)-jA(t-\tau)e^{-j\omega\tau}]\begin{bmatrix} \sin\theta_2 e^{j\delta_2} \\ \cos\theta_2 \end{bmatrix}$$

wherein, τ is the delay corresponding to the arm length difference between the long arm and the short arm of the second polarization-independent delay interferometer 5.

The fourth interference optical signal directly enters one photoelectric detector of the second balanced detector 7, and the third interference optical signal enters the other photoelectric detector of the second balanced detector 7 after passing through the second circulator 3. The second differential current signal is generated after balanced detection, namely the quadrature component, which can be written as:

$$I_Q(t) = R[|E_{out3}(t)|^2 - |E_{out4}(t)|^2] = \frac{R}{2}|E(t)||E(t-\tau)|\sin(\omega\tau)$$

$$= \frac{R}{2}A(t)A(t-\tau)\sin(\omega\tau)$$

It can be seen that quadrature component based on self-interference of the signal output from the second balanced detector 7 is polarization-independent.

Finally, the electrical signal processing module 8 synthesizes the electrical signal in in-phase component and the electrical signal in quadrature component into a complex signal, which can be written as:

$$u(t) = I_I(t) + jI_Q(t) = \frac{R}{2}E(t)E^*(t-\tau)$$

The above complex signal is sampled and digitally processed by the electrical signal processing module 8, to restore the electric field information of the signal light, so as to obtain service data.

Figure 6:
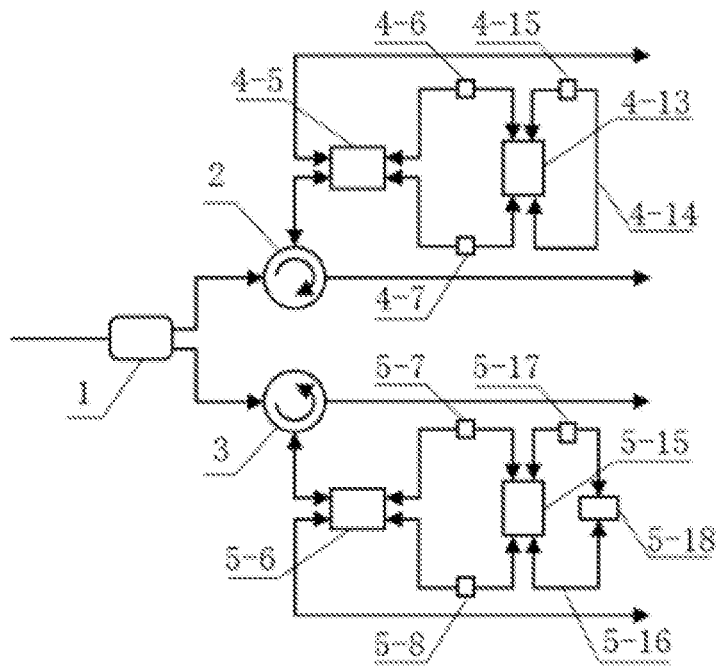
FIG. 6 is a schematic block diagram of the self-coherent receiver based on polarization-independent delay interferometers of Embodiment 5 of the present disclosure (optical part)

FIG. 6 shows the self-coherent receiver based on polarization-independent delay interferometers of Embodiment 5 of the present disclosure.

The self-coherent receiver based on polarization-independent delay interferometers is so configured, that the first polarization-independent delay interferometer 4 includes a first polarization beam splitter 4-5, a first 45° polarization-rotation structure 4-6, a second 45° polarization-rotation structure 4-7, a ninth polarization beam splitter 4-13, a fifth long-arm optical fiber 4-14, and a first 90° polarization-rotation structure 4-15.

The first polarization beam splitter 4-5 is configured to split the first signal light component to a first polarized signal light component and a second polarized signal light component.

The first 45° polarization-rotation structure 4-6 and the second 45° polarization-rotation structure 4-7 are respectively configured to rotate the polarization states of the first polarized signal light component and the second polarized signal light component by 45° correspondingly.

The ninth polarization beam splitter 4-13 is configured to transmit a horizontal polarization component of the first polarized signal light component to the fifth long-arm optical fiber 4-14, which then undergoes a polarization-rotation of 90° by the first 90° polarization-rotation structure 4-15; and to reflect directly a vertical polarization component thereof, and then to polarization-combine the both, to generate a first polarization interference optical signal; and the ninth polarization beam splitter is configured to reflect directly the horizontal polarization component of the second polarized signal light component while transmit a vertical polarization component thereof to the fifth long-arm optical fiber 4-14, which then undergoes a polarization-rotation of 90° by the first 90° polarization-rotation structure 4-15, and then to polarization-combine the both, to generate a second polarized optical signal.

The first 45° polarization-rotation structure 4-6 and the second 45° polarization-rotation structure 4-7 are also respectively configured to rotate the polarization states of the second polarization interference optical signal and the first polarization interference optical signal by 45° correspondingly.

The first polarization beam splitter 4-5 is further configured to combine the horizontal polarization component of the first polarization interference optical signal and the horizontal polarization component of the second polarization interference optical signal, to generate a first interference optical signal; and to combine the vertical polarization component of the first polarization interference optical signal and the vertical polarization component of the second polarization interference optical signal, to generate a second interference optical signal.

The second polarization-independent delay interferometer 5 includes a third polarization beam splitter 5-6, a third 45° polarization-rotation structure 5-7, a fourth 45° polarization-rotation structure 5-8, a tenth polarization beam splitter 5-15, a sixth long-arm optical fiber 5-16, a second 90° polarization-rotation structure 5-17 and a third phase shifter 5-18.

The third polarization beam splitter 5-6 is configured to split the second signal light component to a third polarized signal light component and a fourth polarized signal light component.

The third 45° polarization-rotation structure 5-7 and the fourth 45° polarization-rotation structure 5-8 are respectively configured to rotate the polarization states of the third polarized signal light component and the fourth polarized signal light component by 45° correspondingly.

The tenth polarization beam splitter 5-15 is configured to transmit a horizontal polarization component of the third polarized signal light component to the sixth long-arm optical fiber 5-16, which then undergoes a polarization-rotation of 90° by the second 90° polarization-rotation structure 5-17, and to reflect directly a vertical polarization component thereof, and then to polarization-combine the both, to generate a third polarization interference optical signal; and the tenth polarization beam splitter is configured to reflect directly the horizontal polarization component of the fourth polarized signal light component while transmit a vertical polarization component to the sixth long-arm optical fiber 5-16, which then undergoes a polarization-rotation of 90° by the second 90° polarization-rotation structure 5-17, and then to polarization-combine the both, to generate a fourth polarized optical signal.

The third phase shifter 5-18 is configured to adjust phase of the optical signal passing the sixth long-arm optical fiber 5-16, so that a phase difference between it and the optical signal reflected directly by the tenth polarization beam splitter 5-15 is $\pi/2$.

The third 45° polarization-rotation structure 5-7 and the fourth 45° polarization-rotation structure 5-8 are also respectively configured to rotate the polarization states of the fourth polarization interference optical signal and the third polarization interference optical signal by 45° correspondingly.

The third polarization beam splitter 5-6 is further configured to combine the horizontal polarization component of the third polarization interference optical signal and the horizontal polarization component of the fourth polarization interference optical signal, to generate a third interference optical signal; and to combine the vertical polarization component of the third polarization interference optical signal and the vertical polarization component of the fourth polarization interference optical signal, to generate a fourth interference optical signal.

The specific work process of Embodiment 5 includes:

The signal light received by the receiver E(t) first enters the first beam splitter 1 and is split into the first signal light component $E_1(t)$ and the second signal light component $E_2(t)$, conforming to $$E_1(t) = E_2(t) = 1/\sqrt{2}\, E(t).$$

Since the polarization becomes random when the signal light reaches the receiver through the fiber channel, which can be expressed as:

$$E(t) = A(t)e^{j(\omega t + \varphi_0)}\begin{bmatrix} \cos\theta \\ \sin\theta\, e^{j\delta} \end{bmatrix},$$

wherein $\theta$ is the angle between the horizontal polarization component and the vertical polarization component of the signal light, and $\delta$ is the phase difference between the both.

Before the first signal light component reaches the first polarization beam splitter 4-5 through the first circulator 2, the polarization state is turned to:

$$E_1(t) = \frac{A(t)e^{j(\omega t + \varphi_0)}}{\sqrt{2}}\begin{bmatrix} \cos\theta_1 \\ \sin\theta_1\, e^{j\delta_1} \end{bmatrix},$$

and then is polarization-split by the first beam splitter 4-5 into a first polarized signal light component $E_{11}(t)$ and a second polarized signal light component $E_{12}(t)$. The polarization state of $E_{11}(t)$ after passing through the first 45° polarization-rotation structure 4-6 is turned to:

$$E_{11}(t) = \frac{A(t)e^{j(\omega t + \varphi_0)}}{2}\begin{bmatrix} \cos\theta_1 \\ \cos\theta_1 \end{bmatrix},$$

and then is polarization-split after reaching one input port of the ninth polarization beam splitter 4-13, wherein the horizontal polarization component is transmitted to the fifth long-arm optical fiber 4-14, and then passes the first 90° polarization-rotation structure 4-15 to undergo a polarization-rotation of 90°, afterwards is output from the other input port of the ninth polarization beam splitter 4-13, while the vertical polarization component is reflected directly to the other input port, and then the both undergo a polarization-dependent combining-interference, to generate a first polarization interference optical signal, whose polarization state is:

$$E_{11out}(t) = \frac{e^{j(\omega t+\varphi_0)}\cos\theta_1}{2}\begin{bmatrix} A(t) \\ A(t-\tau)e^{-j\omega\tau} \end{bmatrix},$$

which after passing through the second 45° polarization-rotation structure 4-7 is turned to:

$$E_{11out}(t) = \frac{e^{j(\omega t+\varphi_0)}\cos\theta_1}{2\sqrt{2}}\begin{bmatrix} A(t)+A(t-\tau)e^{-j\omega\tau} \\ A(t)-A(t-\tau)e^{-j\omega\tau} \end{bmatrix},$$

The polarization state of $E_{12}(t)$ after passing through the second 45° polarization-rotation structure 4-7 is turned to:

$$E_{12}(t) = \frac{A(t)e^{j(\omega t+\varphi_0)}}{2}\begin{bmatrix} \sin\theta_1 e^{j\delta_1} \\ \sin\theta_1 e^{j\delta_1} \end{bmatrix},$$

and then is polarization-split after reaching the other input port of the ninth polarization beam splitter 4-13, wherein the horizontal polarization component is transmitted to the fifth long-arm optical fiber 4-14, and then passes the first 90° polarization-rotation structure 4-15 to undergo a polarization-rotation of 90°, afterwards is output from one input port of the ninth polarization splitter 4-13, while the vertical polarization component is transmitted directly to one input port, and then the both undergo a polarization-dependent combining-interference, to generate a second polarization interference optical signal, whose polarization state is:

$$E_{12out}(t) = \frac{e^{j(\omega t+\varphi_0)}\sin\theta_1 e^{j\delta_1}}{2}\begin{bmatrix} A(t) \\ A(t-\tau)e^{-j\omega\tau} \end{bmatrix},;$$

which after passing through the first 45° polarization-rotation structure 4-6 is turned to:

$$E_{12out}(t) = \frac{e^{j(\omega t+\varphi_0)}\sin\theta_1 e^{j\delta_1}}{2\sqrt{2}}\begin{bmatrix} A(t)+A(t-\tau)e^{-j\omega\tau} \\ A(t)-A(t-\tau)e^{-j\omega\tau} \end{bmatrix},$$

The horizontal polarization component of the first polarization interference optical signal $E_{11out}(t)$ and the horizontal polarization component of the second polarization interference optical signal $E_{12out}(t)$ are simultaneously output from one input port of the first polarization beam splitter 4-5 and combined to the first interference optical signal:

$$E_{out1}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix}$$

The vertical polarization component of the first polarization interference optical signal $E_{11out}(t)$ and the vertical polarization component of the second polarization interference optical signal $E_{12out}(t)$ are simultaneously output from the other input port of the first polarization beam splitter 4-5 and combined to the second interference optical signal:

$$E_{out2}(t) = \frac{e^{j(\omega t+\varphi_0)}}{2\sqrt{2}}[A(t)-A(t-\tau)e^{-j\omega\tau}]\begin{bmatrix} \sin\theta_1 e^{j\delta_1} \\ \cos\theta_1 \end{bmatrix}$$

The second interference optical signal directly enters one photoelectric detector of the first balanced detector 6, while the first interference optical signal enters the other photoelectric detector of the first balanced detector 6 after passing through the first circulator 2. The first differential current signal is generated after balanced detection, namely the in-phase component, which can be written as:

$$I_I(t) = R[|E_{out1}(t)|^2 - |E_{out2}(t)|^2] = \frac{R}{2}|E(t)||E(t-\tau)|\cos(\omega\tau) = \frac{R}{2}A(t)A(t-\tau)\cos(\omega\tau)$$

among them, R is the response efficiency of the photoelectric detector, and ω is the angular frequency of the signal light. It can be seen that the in-phase component based on self-interference of the signal output from the first balanced detector 6 is polarization-independent.

The second signal light component reaches the second polarization beam splitter 5-6 after passing through the second circulator 3 and goes through a similar polarization-independent delayed self-interference as the first signal light component, to generate a third interference optical signal $E_{out3}(t)$ and a fourth interference optical signal $E_{out4}(t)$. Because the third phase shifter 5-18 ensures the phase difference between the long arm and the short arm is π/2, the both can be respectively written as:

$$E_{out3}(t) = \frac{e^{j(\omega t+\varphi_0)}}{2\sqrt{2}}[A(t)+jA(t-\tau)e^{-j\omega\tau}]\begin{bmatrix} \sin\theta_2 e^{j\delta_2} \\ \cos\theta_2 \end{bmatrix}$$

$$E_{out4}(t) = \frac{e^{j(\omega t+\varphi_0)}}{2\sqrt{2}}[A(t)-jA(t-\tau)e^{-j\omega\tau}]\begin{bmatrix} \sin\theta_2 e^{j\delta_2} \\ \cos\theta_2 \end{bmatrix}$$

wherein, τ is the delay corresponding to the arm length difference between the long arm and the short arm of the second polarization-independent delay interferometer 5.

The fourth interference optical signal directly enters one photoelectric detector of the second balanced detector 7, and the third interference optical signal enters the other photoelectric detector of the second balanced detector 7 after passing through the second circulator 3. The second differential current signal is generated after balanced detection, namely the quadrature component, which can be written as:

$$I_Q(t) = R[|E_{out3}(t)|^2 - |E_{out4}(t)|^2] = \frac{R}{2}|E(t)||E(t-\tau)|\sin(\omega\tau) = \frac{R}{2}A(t)A(t-\tau)\sin(\omega\tau)$$

It can be seen that the quadrature component based on self-interference of the signal output from the second balanced detector 7 is polarization-independent.

Finally, the electrical signal processing module 8 synthesizes the electrical signal in in-phase component and the electrical signal in quadrature component into a complex signal, which can be written as:

$$u(t) = I_I(t) + jI_Q(t) = \frac{R}{2}E(t)E^*(t-\tau)$$

The above complex signal is sampled and digitally processed by the electrical signal processing module 8, to restore the electric field information of the signal light, so as to obtain service data.

Figure 7:
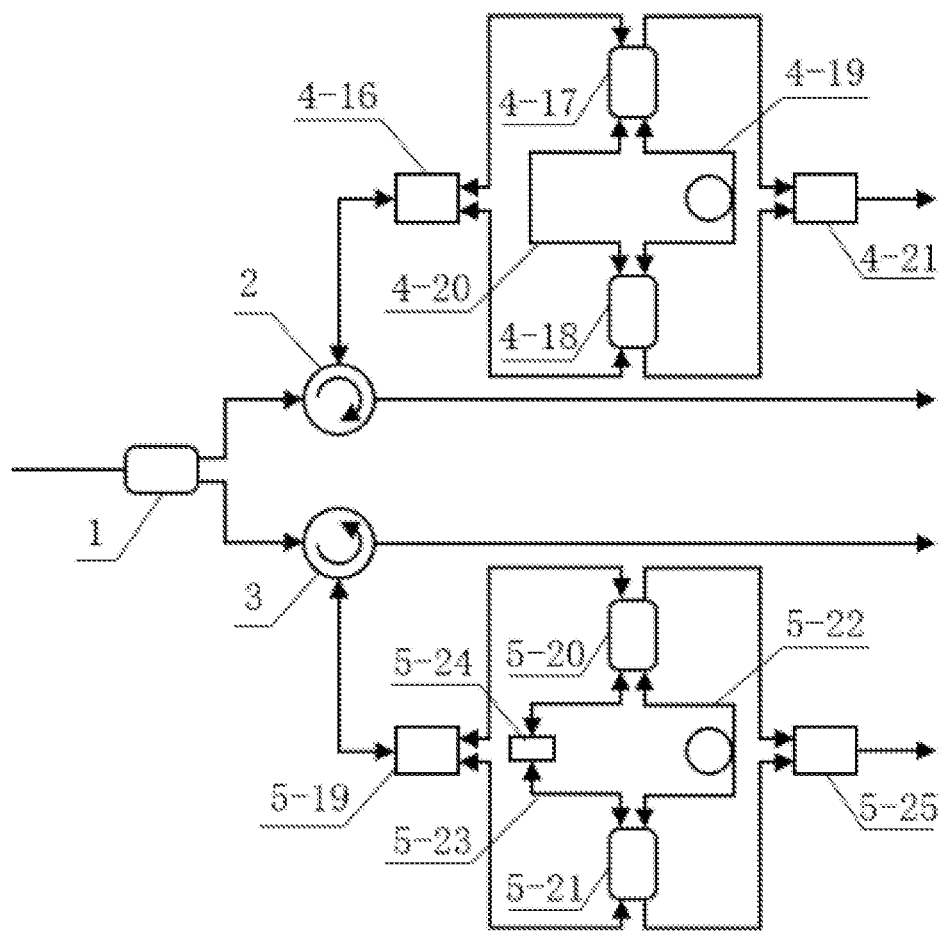
FIG. 7 is a schematic block diagram of the self-coherent receiver based on polarization-independent delay interferometers of Embodiment 6 of the present disclosure (optical part).

FIG. 7 shows the self-coherent receiver based on polarization-independent delay interferometers of Embodiment 6 of the present disclosure.

The self-coherent receiver based on polarization-independent delay interferometers is so configured, that the first polarization-independent delay interferometer 4 includes an eleventh polarization beam splitter 4-16, a fourth beam splitter 4-17, a fifth beam splitter 4-18, a seventh long-arm optical fiber 4-19, a seventh short-arm optical fiber 4-20 and a twentieth polarization beam splitter 4-21.

The eleventh polarization beam splitter 4-16 is configured to polarization-split the first signal light component to a first polarized signal light component and a second polarized signal light component.

The fourth beam splitter 4-17, the fifth beam splitter 4-18, the seventh long-arm optical fiber 4-19 and the seventh short-arm optical fiber 4-20 constitute a first Mach-Zehnder interferometer, which is configured, such that the input first polarized signal light component undergoes a self-interference, to generate a first polarization interference optical signal and a second polarization interference optical signal; and such that the input second polarized signal light component undergoes a self-interference, to generate a third polarization interference optical signal and a fourth polarization interference optical signal.

The eleventh polarization beam splitter 4-16 is further configured to polarization-combine the first polarization interference optical signal and the third polarization interference optical signal, to generate a first interference optical signal. The twelfth polarization beam splitter 4-21 is configured to polarization-combine the second polarization interference optical signal and the fourth polarization interference optical signal, to generate a second interference optical signal.

The second polarization-independent delay interferometer 5 includes a thirteenth polarization beam splitter 5-19, a sixth beam splitter 5-20, a seventh beam splitter 5-21, an eighth long-arm optical fiber 5-22, an eighth short-arm optical fiber 5-23, a fourth phase shifter 5-24 and a fourteenth polarization beam splitter 5-25.

The thirteenth beam splitter 5-19 is configured to polarization-split the second signal light component to a third polarized signal light component and a fourth polarized signal light component.

The sixth beam splitter 5-20, the seventh beam splitter 5-21, the eighth long-arm optical fiber 5-22, the eighth short-arm optical fiber 5-23 and the fourth phase shifter 5-24 constitute a second Mach-Zehnder interferometer, which is configured, such that the input third polarized signal light component undergoes a self-interference, to generate a fifth polarization interference optical signal and a sixth polarization interference optical signal; and such that the input fourth polarized signal light component undergoes a self-interference, to generate a seventh polarization interference optical signal and an eighth polarization interference optical signal.

The fourth phase shifter 5-24 is configured to adjust phase of the optical signal transmitted through the eighth short-arm optical fiber 5-23, so that a phase difference between it and the optical signal transmitted through the eighth long-arm optical fiber 5-22 is π/2.

The thirteenth polarization beam splitter 5-19 is further configured to polarization-combine the fifth polarization interference optical signal and the seventh polarization interference optical signal, to generate a third interference optical signal. The fourteenth polarization beam splitter 5-25 is configured to polarization-combine the sixth polarization interference optical signal and the eighth polarization interference optical signal, to generate a fourth interference optical signal.

The specific work process of Embodiment 6 includes:

The signal light received by the receiver E(t) first enters the first beam splitter 1 and is split into the first signal light component $E_1(t)$ and the second signal light component $E_2(t)$, conforming to $$E_1(t) = E_2(t) = 1/\sqrt{2}\,E(t).$$

Since the polarization becomes random when the signal light reaches the receiver through the fiber channel, which can be expressed as:

$$E(t) = A(t)^{j(\omega t + \varphi_0)}\begin{bmatrix} \cos\theta \\ \sin\theta e^{j\delta} \end{bmatrix},$$

wherein θ is the angle between the horizontal polarization component and the vertical polarization component of the signal light, and δ is the phase difference between the both.

Before the first signal light component reaches the eleventh polarization beam splitter 4-16 through the first circulator 2, the polarization state is turned to:

$$E_1(t) = \frac{A(t)e^{j(\omega t + \varphi_0)}}{\sqrt{2}}\begin{bmatrix} \cos\theta_1 \\ \sin\theta_1 e^{j\delta_1} \end{bmatrix},$$

and then is polarization-split by the eleventh polarization beam splitter 4-16 into a first polarized signal light component $E_{11}(t)$ and a second polarized signal light component $E_{12}(t)$.

Wherein $E_{11}(t)$ enters the first Mach-Zehnder interferometer composed of the fourth beam splitter 4-17, the fifth beam splitter 4-18, the seventh long-arm optical fiber 4-19 and the seventh short-arm optical fiber 4-20, and undergoes a self-interference at the fifth beam splitter 4-18, to generate the first polarization interference optical signal and the second polarization interference optical signal, which are respectively:

$$E_{11out1}(t) = \frac{e^{j(\omega t + \varphi_0)}\cos\theta_1}{2\sqrt{2}}\left[A(t) + A(t-\tau)e^{-j\omega\tau}\right]$$

$$E_{11out2}(t) = \frac{e^{j(\omega t + \varphi_0)}\cos\theta_1}{2\sqrt{2}}\left[A(t) - A(t-\tau)e^{-j\omega\tau}\right]$$

which enters the first Mach-Zehnder interferometer from the fifth beam splitter 4-18 in the opposite direction, and undergoes a self-interference at the fourth beam splitter 4-17, to generate a third polarization interference optical signal and a fourth polarization interference optical signal, which are respectively:

$$E_{12out1}(t) = \frac{e^{j(\omega t+\varphi_0)}\sin\theta_1 e^{j\delta_1}}{2\sqrt{2}}\left[A(t)+A(t-\tau)e^{-j\omega\tau}\right]$$

$$E_{12out2}(t) = \frac{e^{j(\omega t+\varphi_0)}\sin\theta_1 e^{j\delta_1}}{2\sqrt{2}}\left[A(t)-A(t-\tau)e^{-j\omega\tau}\right]$$

The first polarization interference optical signal and the third polarization interference optical signal simultaneously enter the eleventh polarization beam splitter 4-16, to undergo a polarization-dependent combing, to generate a first interference optical signal:

$$E_{out1}(t) = \frac{e^{j(\omega t+\varphi_0)}}{2\sqrt{2}}\left[A(t)+A(t-\tau)e^{-j\omega\tau}\right]\begin{bmatrix}\sin\theta_1 e^{j\delta_1}\\\cos\theta_1\end{bmatrix}$$

The second polarization interference optical signal and the fourth polarization interference optical signal simultaneously enter the twelfth polarization beam splitter 4-21, to undergo a polarization-dependent combing, to generate a second interference optical signal:

$$E_{out2}(t) = \frac{e^{j(\omega t+\varphi_0)}}{2\sqrt{2}}\left[A(t)-A(t-\tau)e^{-j\omega\tau}\right]\begin{bmatrix}\sin\theta_1 e^{j\delta_1}\\\cos\theta_1\end{bmatrix}$$

The second interference optical signal enters directly one photoelectric detector of the first balanced detector 6, while the first interference optical signal enters the other photoelectric detector of the first balanced detector 6 after passing through the first circulator 2. The first differential current signal is generated after balanced detection, namely the in-phase component, which can be written as:

$$I_I(t) = R\left[\,|E_{out1}(t)|^2 - |E_{out2}(t)|^2\,\right] =$$
$$\frac{R}{2}\left|E(t)\|E(t-\tau)\right|\cos(\omega\tau) = \frac{R}{2}A(t)A(t-\tau)\cos(\omega\tau)$$

among them, R is the response efficiency of the photoelectric detector, and ω is the angular frequency of the signal light. It can be seen that the in-phase component based on self-interference of the signal output from the first balanced detector 6 is polarization-independent.

The second signal light component reaches the thirteenth polarization beam splitter 5-19 after passing through the second circulator 3 and goes through a similar polarization-independent delayed self-interference as the first signal light component, to generate a third interference optical signal $E_{out3}(t)$ and a fourth interference optical signal $E_{out4}(t)$. Because the fourth phase shifter 5-24 ensures the phase difference between the long arm and the short arm is π/2, the both can be respectively written as:

$$E_{out3}(t) = \frac{e^{j(\omega t+\varphi_0)}}{2\sqrt{2}}\left[A(t)+jA(t-\tau)e^{-j\omega\tau}\right]\begin{bmatrix}\sin\theta_2 e^{j\delta_2}\\\cos\theta_2\end{bmatrix}$$

$$E_{out4}(t) = \frac{e^{j(\omega t+\varphi_0)}}{2\sqrt{2}}\left[A(t)-jA(t-\tau)e^{-j\omega\tau}\right]\begin{bmatrix}\sin\theta_2 e^{j\delta_2}\\\cos\theta_2\end{bmatrix}$$

wherein, τ is the delay corresponding to the arm length difference between the long arm and the short arm of the second polarization-independent delay interferometer 5.

The fourth interference optical signal directly enters one photoelectric detector of the second balanced detector 7, and the third interference optical signal enters the other photoelectric detector of the second balanced detector 7 after passing through the second circulator 3. The second differential current signal is generated after balanced detection, namely the quadrature component, which can be written as:

$$I_Q(t) = R\left[\,|E_{out3}(t)|^2 - |E_{out4}(t)|^2\,\right] =$$
$$\frac{R}{2}\left|E(t)\|E(t-\tau)\right|\sin(\omega\tau) = \frac{R}{2}A(t)A(t-\tau)\sin(\omega\tau)$$

It can be seen that quadrature component based on self-interference of the signal output from the second balanced detector 7 is polarization-independent.

Finally, the electrical signal processing module 8 synthesizes the electrical signal in in-phase component and the electrical signal in quadrature component into a complex signal, which can be written as:

$$u(t) = I_I(t) + jI_Q(t) = \frac{R}{2}E(t)E^*(t-\tau)$$

The above complex signal is sampled and digitally processed by the electrical signal processing module 8, to restore the electric field information of the signal light, so as to obtain service data.

From various embodiments of the present disclosure, it can be seen that a signal light polarization-independent delayed self-interference can be realized by the self-coherent receiver based on polarization-independent delay interferometer discloseds, without using a polarization controller to actively calibrate the signal light polarization, thereby eliminating influence of the random change of polarization state of the signal light on the receiver, which improves the stability of the receiver. Moreover, the receiver only requires two delay interferometers and two sets of balanced detectors, which eliminates the influence of inconsistent performance of multiple mixers on the mixing results, reduces the difficulty and complexity of electronic signal processing after balanced detection, thus greatly reducing the complexity of the receiving terminal. At the same time, the present disclosure can be applied not only to optical communication systems, but also to continuous variable quantum key distribution systems and sensor systems, thereby having high versatility and practicability.

What is claimed is:

1. A self-coherent receiver based on polarization-independent delay interferometers, comprising: a first beam splitter, a first circulator, a second circulator, a first polarization-independent delay interferometer, a second polarization-independent delay interferometer, a first balanced detector, a second balanced detector and an electrical signal processing module;

the first beam splitter is configured to split a received signal light to generate a first signal light component and a second signal light component;

the first circulator is configured to transmit the first signal light component to a first port of the first polarization-independent delay interferometer; the second circulator is configured to transmit the second signal light component to a first port of the second polarization-independent delay interferometer;

the first polarization-independent delay interferometer has a long arm and a short arm for performing a polarization-independent delayed self-interference on the first signal light component to generate a first interference optical signal and a second interference optical signal respectively output from the first port of the first polarization-independent delay interferometer and a second port of the first polarization-independent delay interferometer; the second polarization-independent delay interferometer has a long arm and a short arm for performing a polarization-independent delayed self-interference on the second signal light component, so as to generate a third interference optical signal and a fourth interference optical signal respectively output from the first port of the second polarization-independent delay interferometer and a second port of the second polarization-independent delay interferometer, wherein a phase difference between the long arm and the short arm of the second polarization-independent delay interferometer is $\pi/2$;

the first circulator is further configured to transmit the first interference optical signal to the first balanced detector; the second circulator is further configured to transmit the third interference optical signal to the second balanced detector;

the first balanced detector is configured to perform a balanced detection on the first interference optical signal and the second interference optical signal to generate a first differential current signal; the second balanced detector is configured to perform a balanced detection on the third interference optical signal and the fourth interference optical signal, to generate a second differential current signal;

the electrical signal processing module is configured to receive the first differential current signal and the second differential current signal, and sample and process the first differential current signal and the second differential current signal, to restore service data.

2. The self-coherent receiver based on polarization-independent delay interferometers according to claim 1, wherein the first polarization-independent delay interferometer comprises a second beam splitter, a first long-arm optical fiber, a first short-arm optical fiber and a first reflection module;

the second beam splitter is configured to split an input first signal light component to generate a first long-arm component and a first short-arm component, wherein the first long-arm component and the first short-arm component correspondingly enter the first long-arm optical fiber and the first short-arm optical fiber respectively;

the first reflection module is configured to respectively reflect the first long-arm component transmitted through the first long-arm optical fiber and the first short-arm component transmitted through the first short-arm optical fiber, such that a horizontal polarization component and a vertical polarization component of each of the first long-arm component and the first short-arm component are respectively rotated to be vertically polarized and horizontally polarized;

the second beam splitter is further configured to interfere the reflected first long-arm component and the reflected first short-arm component to generate the first interference optical signal and the second interference optical signal;

the second polarization-independent delay interferometer comprises a third beam splitter, a second long-arm optical fiber, a second short-arm optical fiber, a first phase shifter and a second reflection module;

the third beam splitter is configured to split an input second signal light component to generate a second long-arm component and a second short-arm component, wherein the second long-arm component and the second short-arm component correspondingly enter the second long-arm optical fiber and the second short-arm optical fiber respectively;

the second reflection module is configured to respectively reflect the second long-arm component transmitted through the second long-arm optical fiber and the second short-arm component transmitted through the second short-arm optical fiber, such that a horizontal polarization component and a vertical polarization component of each of the second long-arm component and the second short-arm component are respectively rotated to be vertically polarized and horizontally polarized;

the first phase shifter is configured to adjust a phase of the second short-arm component, so that a phase difference between the second short-arm component and the second long-arm component is $\pi/2$;

the third beam splitter is further configured to interfere the reflected second long-arm component and the reflected second short-arm component to generate the third interference optical signal and the fourth interference optical signal.

3. The self-coherent receiver based on polarization-independent delay interferometers according to claim 1, wherein the first polarization-independent delay interferometer comprises a first polarization beam splitter, a first 45° polarization-rotation structure, a second 45° polarization-rotation structure, a second polarization beam splitter, a first long-arm optical fiber, a first short-arm optical fiber and a first reflection module;

the first polarization beam splitter is configured to split the first signal light component to generate a first polarized signal light component and a second polarized signal light component;

the first 45° polarization-rotation structure and the second 45° polarization-rotation structure are respectively configured to rotate a polarization state of each of the first polarized signal light component and the second polarized signal light component by 45° correspondingly;

the second polarization beam splitter is configured to transmit a horizontal polarization component of the first polarized signal light component to the first long-arm optical fiber and reflect a vertical polarization component of the first polarized signal light component to the first short-arm optical fiber; and to reflect a horizontal polarization component of the second polarized signal light component to the first long-arm optical fiber and transmit a vertical polarization component of the second polarized signal light component to the first short-arm optical fiber;

the first reflection module is configured to respectively reflect the horizontal polarization component of the first polarized signal light component transmitted through the first long-arm optical fiber and the vertical polarization component of the first polarized signal light component transmitted through the first short-arm optical fiber, such that a polarization state of each of the horizontal polarization component of the first polarized signal light component transmitted through the first long-arm optical fiber and the vertical polarization component of the first polarized signal light component transmitted through the first short-arm optical fiber is rotated by 90°; and the first reflection module is configured to respectively reflect the horizontal polarization component of the second polarized signal light component transmitted through the first long-arm optical fiber and the vertical polarization component of the second polarized signal light component transmitted through the first short-arm optical fiber, such that a polarization state of each of the horizontal polarization component of the second polarized signal light component transmitted through the first long-arm optical fiber and the vertical polarization component of the second polarized signal light component transmitted through the first short-arm optical fiber is rotated by 90°;

the second polarization beam splitter is further configured to perform a polarization interference on the reflected horizontal polarization component and the reflected vertical polarization component of the first polarized signal light component to generate a first polarization interference optical signal; and to perform a polarization interference on the reflected horizontal polarization component and the reflected vertical polarization component of the second polarized signal light component, to generate a second polarization interference optical signal;

the first 45° polarization-rotation structure and the second 45° polarization-rotation structure are further respectively configured to rotate a polarization state of each of the second polarization interference optical signal and the first polarization interference optical signal by 45° correspondingly;

the first polarization beam splitter is further configured to combine a horizontal polarization component of the first polarization interference optical signal and a horizontal polarization component of the second polarization interference optical signal to generate the first interference optical signal; and to combine a vertical polarization component of the first polarization interference optical signal and a vertical polarization component of the second polarization interference optical signal to generate the second interference optical signal;

the second polarization-independent delay interferometer comprises a third polarization beam splitter, a third 45° polarization-rotation structure, a fourth 45° polarization-rotation structure, a fourth polarization beam splitter, a second long-arm optical fiber, a second short-arm optical fiber, a first phase shifter and a second reflection module;

the third polarization beam splitter is configured to split the second signal light component to generate a third polarized signal light component and a fourth polarized signal light component;

the third 45° polarization-rotation structure and the fourth 45° polarization-rotation structure are respectively configured to rotate a polarization state of each of the third polarized signal light component and the fourth polarized signal light component by 45° correspondingly;

the fourth polarization beam splitter is configured to transmit a horizontal polarization component of the third polarized signal light component to the second long-arm optical fiber, and reflect a vertical polarization component of the third polarized signal light component to the second short-arm optical fiber; and the fourth polarization beam splitter is configured to reflect a horizontal polarization component of the fourth polarized signal light component to the second long-arm optical fiber, and transmit a vertical polarization component of the fourth polarized signal light component to the second short-arm optical fiber;

the second reflection module is configured to respectively reflect the horizontal polarization component of the third polarized signal light component transmitted through the second long-arm optical fiber and the vertical polarization component of the third polarized signal light component transmitted through the second short-arm optical fiber, such that a polarization state of each of the horizontal polarization component of the third polarized signal light component transmitted through the second long-arm optical fiber and the vertical polarization component of the third polarized signal light component transmitted through the second short-arm optical fiber is rotated by 90°; and the second reflection module is configured to respectively reflect the horizontal polarization component of the fourth polarized signal light component transmitted through the second long-arm optical fiber and the vertical polarization component of the fourth polarized signal light component transmitted through the second short-arm optical fiber, such that a polarization state of each of the horizontal polarization component of the fourth polarized signal light component transmitted through the second long-arm optical fiber and the vertical polarization component of the fourth polarized signal light component transmitted through the second short-arm optical fiber is rotated by 90°;

the first phase shifter is configured to adjust a phase of an optical signal passing the second short-arm optical fiber, so that a phase difference between the optical signal passing the second short-arm optical fiber and an optical signal passing the second long-arm optical fiber is $\pi/2$;

the fourth polarization beam splitter is further configured to perform a polarization interference on the reflected horizontal polarization component and the reflected vertical polarization component of the third polarized signal light component, to generate a third polarization interference optical signal, and the fourth polarization beam splitter is further configured to perform a polarization interference on the reflected horizontal polarization component and the reflected vertical polarization component of the fourth polarized signal light component, to generate a fourth polarization interference optical signal;

the third 45° polarization-rotation structure and the fourth 45° polarization-rotation structure are further respectively configured to rotate a polarization state of each of the fourth polarization interference optical signal and the third polarization interference optical signal by 45° correspondingly;

the third polarization beam splitter is further configured to combine a horizontal polarization component of the third polarization interference optical signal and a horizontal polarization component of the fourth polarization interference optical signal, to generate the third interference optical signal; and the third polarization beam splitter is further configured to combine a vertical polarization component of the third polarization interference optical signal and a vertical polarization component of the fourth polarization interference optical signal, to generate the fourth interference optical signal.

4. The self-coherent receiver based on polarization-independent delay interferometers according to claim 1, wherein the first polarization-independent delay interferometer comprises a first polarization beam splitter, a first 45° polarization-rotation structure, a second 45° polarization-rotation structure, a fifth polarization beam splitter, a sixth polarization beam splitter, a third long-arm optical fiber, a third short-arm optical fiber;

the first polarization beam splitter is configured to split the first signal light component to a first polarized signal light component and a second polarized signal light component;

the first 45° polarization-rotation structure and the second 45° polarization-rotation structure are respectively configured to rotate a polarization state of each of the first polarized signal light component and the second polarized signal light component by 45° correspondingly;

the fifth polarization beam splitter is configured to transmit a horizontal polarization component of the first polarized signal light component to the third short-arm optical fiber, and reflect a vertical polarization component of the first polarized signal light component to the third long-arm optical fiber; the sixth polarization beam splitter is configured to transmit a horizontal polarization component of the second polarized signal light component to the third short-arm optical fiber, and reflect a vertical polarization component of the second polarized signal light component to the third long-arm optical fiber;

the sixth polarization beam splitter is further configured to perform a polarization interference on the horizontal polarization component of the first polarized signal light component transmitted through the third short-arm optical fiber and the vertical polarization component of the first polarized signal light component transmitted through the third long-arm optical fiber, to generate a first polarization interference optical signal; the fifth polarization beam splitter is further configured to perform a polarization interference on the horizontal polarization component of the second polarized signal light component transmitted through the third short-arm optical fiber and the vertical polarization component of the second polarized signal light component transmitted through the third long-arm optical fiber, to generate a second polarization interference optical signal;

the first 45° polarization-rotation structure and the second 45° polarization-rotation structure are further respectively configured to rotate a polarization state of each of the second polarization interference optical signal and the first polarization interference optical signal by 45° correspondingly;

the first polarization beam splitter is further configured to combine a horizontal polarization component of the first polarization interference optical signal and a horizontal polarization component of the second polarization interference optical signal, to generate the first interference optical signal; and the first polarization beam splitter is further configured to combine a vertical polarization component of the first polarization interference optical signal and a vertical polarization component of the second polarization interference optical signal, to generate the second interference optical signal;

the second polarization-independent delay interferometer comprises a third polarization beam splitter, a third 45° polarization-rotation structure, a fourth 45° polarization-rotation structure, a seventh polarization beam splitter, an eighth polarization beam splitter, a fourth long-arm optical fiber, a fourth short-arm optical fiber and a second phase shifter;

the third polarization beam splitter is configured to split the second signal light component to a third polarized signal light component and a fourth polarized signal light component;

the third 45° polarization-rotation structure and the fourth 45° polarization-rotation structure are respectively configured to rotate a polarization state of each of the third polarized signal light component and the fourth polarized signal light component by 45° correspondingly;

the seventh polarization beam splitter is configured to transmit a horizontal polarization component of the third polarized signal light component to the fourth short-arm optical fiber, and reflect a vertical polarization component of the third polarized signal light component to the fourth long-arm optical fiber; the eighth polarization beam splitter is configured to transmit a horizontal polarization component of the fourth polarized signal light component to the fourth short-arm optical fiber, and reflect a vertical polarization component of the fourth polarized signal light component to the fourth long-arm optical fiber;

the second phase shifter is configured to adjust a phase of an optical signal passing the fourth short-arm optical fiber, so that a phase difference between the optical signal passing the fourth short-arm optical fiber and an optical signal passing the fourth long-arm optical fiber is $\pi/2$;

the eighth polarization beam splitter is further configured to perform a polarization interference on the horizontal polarization component of the third polarized signal light component transmitted by the fourth short-arm optical fiber and the vertical polarization component of the third polarized signal light component transmitted by the fourth long-arm optical fiber to generate a third polarization interference optical signal; the seventh polarization beam splitter is further configured to perform a polarization interference on the horizontal polarization component of the fourth polarized signal light component transmitted by the fourth short-arm optical fiber and the vertical polarization component of the fourth polarized signal light component transmitted by the fourth long-arm optical fiber to generate a fourth polarization interference optical signal;

the third 45° polarization-rotation structure and the fourth 45° polarization-rotation structure are further respectively configured to rotate a polarization state of each of the fourth polarization interference optical signal and the third polarization interference optical signal by 45° correspondingly;

the third polarization beam splitter is further configured to combine the horizontal polarization component of the third polarization interference optical signal and the horizontal polarization component of the fourth polarization interference optical signal to generate the third interference optical signal; and to combine the vertical polarization component of the third polarization interference optical signal and the vertical polarization component of the fourth polarization interference optical signal to generate the fourth interference optical signal.

5. The self-coherent receiver based on polarization-independent delay interferometers according to claim 1, wherein the first polarization-independent delay interferometer comprises a first polarization beam splitter, a first 45° polarization-rotation structure, a second 45° polarization-rotation structure, a ninth polarization beam splitter, a fifth long-arm optical fiber, and a first 90° polarization-rotation structure;

the first polarization beam splitter is configured to split the first signal light component to generate a first polarized signal light component and a second polarized signal light component;

the first 45° polarization-rotation structure and the second 45° polarization-rotation structure are respectively configured to rotate a polarization state of each of the first polarized signal light component and the second polarized signal light component by 45° correspondingly;

the ninth polarization beam splitter is configured to transmit a horizontal polarization component of the first polarized signal light component to the fifth long-arm optical fiber and reflect a vertical polarization component of the first polarized signal light component, wherein after passing through the fifth long-arm optical fiber, the horizontal polarization component of the first polarized signal light component is polarization-rotated by the first 90° polarization-rotation structure by 90°, and the polarization-rotated horizontal polarization component of the first polarized signal light component and the reflected vertical polarization component of the first polarized signal light component are polarization-combined to generate a first polarization interference optical signal; and the ninth polarization beam splitter is further configured to reflect a horizontal polarization component of the second polarized signal light component and transmit a vertical polarization component of the second polarized signal light component to the fifth long-arm optical fiber, wherein, after passing through the fifth long-arm optical fiber, the vertical polarization component of the second polarized signal light component is polarization-rotated by the first 90° polarization-rotation structure by 90°, and the reflected horizontal polarization component of the second polarized signal light component and the polarization-rotated vertical polarization component of the second polarized signal light component are polarization-combined to generate a second polarization interference optical signal;

the first 45° polarization-rotation structure and the second 45° polarization-rotation structure are further respectively configured to rotate a polarization state of each of the second polarization interference optical signal and the first polarization interference optical signal by 45° correspondingly;

the first polarization beam splitter is further configured to combine the horizontal polarization component of the first polarization interference optical signal and the horizontal polarization component of the second polarization interference optical signal to generate the first interference optical signal; and the first polarization beam splitter is further configured to combine the vertical polarization component of the first polarization interference optical signal and the vertical polarization component of the second polarization interference optical signal to generate the second interference optical signal;

the second polarization-independent delay interferometer comprises a third polarization beam splitter, a third 45° polarization-rotation structure, a fourth 45° polarization-rotation structure, a tenth polarization beam splitter, a sixth long-arm optical fiber, a second 90° polarization-rotation structure and a third phase shifter;

the third polarization beam splitter is configured to split the second signal light component to generate a third polarized signal light component and a fourth polarized signal light component;

the third 45° polarization-rotation structure and the fourth 45° polarization-rotation structure are respectively configured to rotate a polarization state of each of the third polarized signal light component and the fourth polarized signal light component by 45° correspondingly;

the tenth polarization beam splitter is configured to transmit a horizontal polarization component of the third polarized signal light component to the sixth long-arm optical fiber and reflect a vertical polarization component of the third polarized signal light component, wherein, after passing through the sixth long-arm optical fiber, the horizontal polarization component of the third polarized signal light component is polarization-rotated by the second 90° polarization-rotation structure by 90°, and the polarization-rotated horizontal polarization component of the third polarized signal light component and the reflected vertical polarization component of the third polarized signal light component are polarization combined to generate a third polarization interference optical signal; and the tenth polarization beam splitter is further configured to reflect a horizontal polarization component of the fourth polarized signal light component, and transmit a vertical polarization component of the fourth polarized signal light component to the sixth long-arm optical fiber, wherein after passing through the sixth long-arm optical fiber, the vertical polarization component of the fourth polarized signal light component is polarization-rotated by the second 90° polarization-rotation structure by 90°, and the reflected horizontal polarization component of the fourth polarized signal light component and the polarization-rotated vertical polarization component of the fourth polarized signal light component are polarization combined to generate a fourth polarization interference optical signal;

the third phase shifter is configured to adjust a phase of an optical signal passing the sixth long-arm optical fiber, so that a phase difference between the optical signal passing the sixth long-arm optical fiber and an optical signal reflected by the tenth polarization beam splitter is $\pi/2$;

the third 45° polarization-rotation structure and the fourth 45° polarization-rotation structure are further respectively configured to rotate a polarization state of each of the fourth polarization interference optical signal and the third polarization interference optical signal by 45° correspondingly;

the third polarization beam splitter is further configured to combine a horizontal polarization component of the third polarization interference optical signal and a horizontal polarization component of the fourth polarization interference optical signal to generate the third interference optical signal; and the third polarization beam splitter is further configured to combine a vertical polarization component of the third polarization interference optical signal and a vertical polarization component of the fourth polarization interference optical signal to generate the fourth interference optical signal.

6. The self-coherent receiver based on polarization-independent delay interferometers according to claim 1, wherein the first polarization-independent delay interferometer comprises an eleventh polarization beam splitter, a fourth beam splitter, a fifth beam splitter, a seventh long-arm optical fiber, a seventh short-arm optical fiber and a twelfth polarization beam splitter;

the eleventh polarization beam splitter is configured to polarization-split the first signal light component to generate a first polarized signal light component and a second polarized signal light component;

the fourth beam splitter, the fifth beam splitter, the seventh long-arm optical fiber and the seventh short-arm optical fiber constitute a first Mach-Zehnder interferometer, which is configured to perform a self-interference on the first polarized signal light component to generate a first polarization interference optical signal and a second polarization interference optical signal; and to perform a self-interference on the second polarized signal light component to generate a third polarization interference optical signal and a fourth polarization interference optical signal;

the eleventh polarization beam splitter is further configured to polarization-combine the first polarization interference optical signal and the third polarization interference optical signal to generate the first interference optical signal; the twelfth polarization beam splitter is configured to polarization-combine the second polarization interference optical signal and the fourth polarization interference optical signal to generate the second interference optical signal;

the second polarization-independent delay interferometer comprises a thirteenth polarization beam splitter, a sixth beam splitter, a seventh beam splitter, an eighth long-arm optical fiber, an eighth short-arm optical fiber, a fourth phase shifter and a fourteenth polarization beam splitter;

the thirteenth polarization beam splitter is configured to polarization-split the second signal light component to generate a third polarized signal light component and a fourth polarized signal light component;

the sixth beam splitter, the seventh beam splitter, the eighth long-arm optical fiber, the eighth short-arm optical fiber and the fourth phase shifter constitute a second Mach-Zehnder interferometer, which is configured to perform a self-interference on the third polarized signal light component to generate a fifth polarization interference optical signal and a sixth polarization interference optical signal; and to perform a self-interference on the fourth polarized signal light component to generate a seventh polarization interference optical signal and an eighth polarization interference optical signal;

the fourth phase shifter is configured to adjust a phase of an optical signal transmitted through the eighth short-arm optical fiber, so that a phase difference between the optical signal transmitted through the eighth short-arm optical fiber and an optical signal transmitted through the eighth long-arm optical fiber is $\pi/2$;

the thirteenth polarization beam splitter is further configured to polarization-combine the fifth polarization interference optical signal and the seventh polarization interference optical signal to generate the third interference optical signal; the fourteenth polarization beam splitter is configured to polarization-combine the sixth polarization interference optical signal and the eighth polarization interference optical signal to generate the fourth interference optical signal.

7. The self-coherent receiver based on polarization-independent delay interferometers according to claim 2, wherein each of the first reflection module and the second reflection module comprises a first Faraday mirror and a second Faraday mirror, the first Faraday mirror and the second Faraday mirror are respectively configured to reflect an input optical signal such that a polarization state of the input optical signal is rotated by 90°.

8. The self-coherent receiver based on polarization-independent delay interferometers according to claim 3, wherein each of the first reflection module and the second reflection module comprises a first Faraday mirror and a second Faraday mirror, the first Faraday mirror and the second Faraday mirror are respectively configured to reflect an input optical signal such that a polarization state of the input optical signal is rotated by 90°.

9. The self-coherent receiver based on polarization-independent delay interferometers according to claim 2, wherein each of the first reflection module and the second reflection module comprises a first quarter-wave mirror and a second quarter-wave mirror; the first long-arm optical fiber, the first short-arm optical fiber, the second long-arm optical fiber and the second short-arm optical fiber are all polarization-maintaining optical fibers;

each of the first quarter-wave mirror and the second quarter-wave mirror comprises a quarter-wave plate and a reflector, an angle between a main axis of the quarter-waver plate and a horizontal direction is 45°, the first quarter-wave mirror and the second quarter-wave mirror are respectively configured to reflect an input optical signal, such that a horizontal polarization component and a vertical polarization component of the input optical signal are respectively rotated to be a vertical polarization component and a horizontal polarization component.

10. The self-coherent receiver based on polarization-independent delay interferometers according to claim 3, wherein each of the first reflection module and the second reflection module comprises a first quarter-wave mirror and a second quarter-wave mirror; the first long-arm optical fiber, the first short-arm optical fiber, the second long-arm optical fiber and the second short-arm optical fiber are all polarization-maintaining optical fibers;

each of the first quarter-wave mirror and the second quarter-wave mirror comprises a quarter-wave plate and a reflector, an angle between a main axis of the quarter-waver plate and a horizontal direction is 45°, the first quarter-wave mirror and the second quarter-wave mirror are respectively configured to reflect an input optical signal, such that a horizontal polarization component and a vertical polarization component of the input optical signal are respectively rotated to be a vertical polarization component and a horizontal polarization component.

11. The self-coherent receiver based on polarization-independent delay interferometers according to claim 2, wherein each of the first reflection module and the second reflection module comprises a first Sagnac ring composed of a fifteenth polarization beam splitter, a first 90° Faraday rotator and a second Sagnac ring composed of a sixteenth polarization beam splitter and a second 90° Faraday rotator;

two output ports of the fifteenth polarization beam splitter are respectively connected to the first 90° Faraday rotator by a polarization-maintaining fiber; two output ports of the sixteenth polarization beam splitter are respectively connected to the second 90° Faraday rotator by a polarization-maintaining fiber;

the first Sagnac ring and the second Sagnac ring are respectively configured to reflect an input optical signal, and to rotate a polarization state of the input optical signal by 90°.

12. The self-coherent receiver based on polarization-independent delay interferometers according to claim 3, wherein each of the first reflection module and the second reflection module comprises a first Sagnac ring composed of a fifteenth polarization beam splitter, a first 90° Faraday rotator and a second Sagnac ring composed of a sixteenth polarization beam splitter and a second 90° Faraday rotator;

two output ports of the fifteenth polarization beam splitter are respectively connected to the first 90° Faraday rotator by a polarization-maintaining fiber; two output ports of the sixteenth polarization beam splitter are respectively connected to the second 90° Faraday rotator by a polarization-maintaining fiber;

the first Sagnac ring and the second Sagnac ring are respectively configured to reflect an input optical signal, and to rotate a polarization state of the input optical signal by 90°.

13. The self-coherent receiver based on polarization-independent delay interferometers according to claim 2, wherein each of the first reflection module and the second reflection module comprises a third Sagnac ring composed of a seventeenth polarization beam splitter and a fourth Sagnac ring composed of an eighteenth polarization beam splitter; and the first long-arm optical fiber, the first short-arm optical fiber, the second long-arm optical fiber and the second short-arm optical fiber are all polarization-maintaining optical fibers;

two output ports of the seventeenth polarization beam splitter are directly connected with each other by a polarization-maintaining fiber; two output ports of the eighteenth polarization beam splitter are directly connected with each other by a polarization-maintaining fiber;

the third Sagnac ring and the fourth Sagnac ring are respectively configured to reflect an input optical signal, and to respectively rotate a horizontal polarization component and a vertical polarization component of the input optical signal to be a vertical polarization component and horizontal component.

14. The self-coherent receiver based on polarization-independent delay interferometers according to claim 3, wherein each of the first reflection module and the second reflection module comprises a third Sagnac ring composed of a seventeenth polarization beam splitter and a fourth Sagnac ring composed of an eighteenth polarization beam splitter; and the first long-arm optical fiber, the first short-arm optical fiber, the second long-arm optical fiber and the second short-arm optical fiber are all polarization-maintaining optical fibers;

two output ports of the seventeenth polarization beam splitter are directly connected with each other by a polarization-maintaining fiber; two output ports of the eighteenth polarization beam splitter are directly connected with each other by a polarization-maintaining fiber;

the third Sagnac ring and the fourth Sagnac ring are respectively configured to reflect an input optical signal, and to respectively rotate a horizontal polarization component and a vertical polarization component of the input optical signal to be a vertical polarization component and horizontal component.

15. The self-coherent receiver based on polarization-independent delay interferometers according to claim 2, wherein each of the first reflection module and the second reflection module comprises a fifth Sagnac ring composed of a nineteenth polarization beam splitter and a third 90° Faraday rotator;

two output ports of the nineteenth polarization beam splitter are respectively connected to the third 90° Faraday rotator by a polarization-maintaining fiber;

the fifth Sagnac ring is configured to reflect optical signals input through two paths, and to rotate polarization states of the optical signals input through two paths by 90° and output rotated optical signals from corresponding input ports.

16. The self-coherent receiver based on polarization-independent delay interferometers according to claim 3, wherein each of the first reflection module and the second reflection module comprises a fifth Sagnac ring composed of a nineteenth polarization beam splitter and a third 90° Faraday rotator;

two output ports of the nineteenth polarization beam splitter are respectively connected to the third 90° Faraday rotator by a polarization-maintaining fiber;

the fifth Sagnac ring is configured to reflect optical signals input through two paths, and to rotate polarization states of the optical signals input through two paths by 90° and output rotated optical signals from corresponding input ports.

17. The self-coherent receiver based on polarization-independent delay interferometers according to claim 2, wherein each of the first reflection module and the second reflection module comprises a sixth Sagnac ring composed of a twentieth polarization beam splitter; the first long-arm optical fiber, the first short-arm optical fiber, the second long-arm optical fiber and the second short-arm optical fiber are all polarization-maintaining optical fibers;

two output ports of the twentieth polarization beam splitter are connected directly by a polarization-maintaining optical fiber;

the sixth Sagnac ring is configured to reflect optical signals input through two paths, and to rotate a horizontal polarization component and a vertical polarization component of each of the optical signals input through two paths respectively to a vertical polarization component and a horizontal polarization component correspondingly, and output rotated optical signals from corresponding input ports.

18. The self-coherent receiver based on polarization-independent delay interferometers according to claim 3, wherein each of the first reflection module and the second reflection module comprises a sixth Sagnac ring composed of a twentieth polarization beam splitter; the first long-arm optical fiber, the first short-arm optical fiber, the second long-arm optical fiber and the second short-arm optical fiber are all polarization-maintaining optical fibers;

two output ports of the twentieth polarization beam splitter are connected directly by a polarization-maintaining optical fiber;

the sixth Sagnac ring is configured to reflect optical signals input through two paths, and to rotate a horizontal polarization component and a vertical polarization component of each of the optical signals input through two paths respectively to a vertical polarization component and a horizontal polarization component correspondingly, and output rotated optical signals from corresponding input ports.

* * * * *